US006991669B1

(12) United States Patent
Partridge et al.

(10) Patent No.: US 6,991,669 B1
(45) Date of Patent: Jan. 31, 2006

(54) SYSTEM AND METHOD FOR SILVER RECOVERY AND MONITORING

(75) Inventors: James A. Partridge, Waynesville, NC (US); James E. Partridge, Waynesville, NC (US); Jeffery S. Partridge, Venice, FL (US)

(73) Assignee: Chemtronix, Inc., Waynesville, NC (US)

( * ) Notice: Subject to any disclaimer, the term of this patent is extended or adjusted under 35 U.S.C. 154(b) by 391 days.

(21) Appl. No.: 10/172,507

(22) Filed: Jun. 14, 2002

Related U.S. Application Data

(60) Provisional application No. 60/298,648, filed on Jun. 15, 2001.

(51) Int. Cl.
*C22B 11/06* (2006.01)

(52) U.S. Cl. ............................ 75/313; 75/733; 266/101; 266/170

(58) Field of Classification Search ................. 75/313, 75/733; 266/101, 170
See application file for complete search history.

(56) References Cited

U.S. PATENT DOCUMENTS

| 4,257,864 | A |   | 3/1981  | Gacki             |
|-----------|---|---|---------|-------------------|
| 4,303,441 | A | * | 12/1981 | Lamisse ...... 75/713 |
| 4,346,980 | A |   | 8/1982  | Palazzolo         |
| 4,728,408 | A |   | 3/1988  | Palazzolo         |
| 4,842,644 | A |   | 6/1989  | Senff             |
| 4,881,973 | A |   | 11/1989 | Williams          |
| 4,959,153 | A |   | 9/1990  | Bradshaw et al.   |
| 5,118,402 | A |   | 6/1992  | Engels et al.     |
| 5,133,846 | A |   | 7/1992  | De Niel et al.    |
| 5,389,212 | A |   | 2/1995  | McLaren           |
| 5,451,298 | A |   | 9/1995  | Ueffinger         |
| 5,685,962 | A |   | 11/1997 | Ueffinger         |
| 5,900,041 | A | * | 5/1999  | Riviere et al. ................ 75/713 |

OTHER PUBLICATIONS

"Silver Recovery by Steel Wool." G.I.P. Levenson, Radiography, vol. XXIX, Aug. 1963.
"Improving Silver Recovery in Small Installations II. The Discoloration of Electrolysed Fixers." J.R. Fyson, G.I.P. Levenson and M. G. Rumens. The Journal of Photographic Science, vol. 29, 1981.
"Silver Recovery by Metal Exchange." G.I.P. Levenson. The Journal of Photographic Science, vol. 29, 1981.
"Improving Silver Recovery in Small Installations 3. An Automatic Fixer Management System." A. Green and G.I.P. Levenson. The Journal of Photographic Science, vol. 29, 1981.

(Continued)

*Primary Examiner*—Melvyn Andrews
(74) *Attorney, Agent, or Firm*—Carter, Schnedler, & Monteith

(57) ABSTRACT

A silver recovery and monitoring system including a sensor for transmitting a silver concentration signal in response to the concentration of silver in a fluid, means for determining whether the silver concentration signal indicates the concentration of silver in the fluid to be above a predetermined silver level and for initiating a silver alert signal in response to a determination that the silver concentration signal indicates the concentration of silver in the fluid to be above the predetermined silver level, and means for transmitting a notification signal to a silver monitoring station in response to the silver alert signal.

11 Claims, 44 Drawing Sheets

OTHER PUBLICATIONS

"Application of Porous Electrodes for Silver Recovery from Photographic Fixing Solution. Part II—Axial Field Reactor." The Journal of Photographic Science, vol. 31, 1983 H. Olive et al.

"Use and Consumption of Silver in Photographic Applications in the Printing Industry." W. J. Streeter and A. H. P. Doesborgh. The Journal of Photographic Science, vol. 32, 1984.

"Chemical Pretreatment of Silver Wire Containing Copper for Preparation of Silver/Silver Sulfide Ion Selective Electrode." Njegomir Radic, Kevin J. Mulligan and Harry B. Mark, Jr. Anal. Chem. 1984.

"Recovering Silver from Photographic Process Wastes." N. Sathaiyan, P. Adaikkalam, J.A.M. Abdul Kader and S. Visvanathan. JOM, Oct. 1990.

* cited by examiner

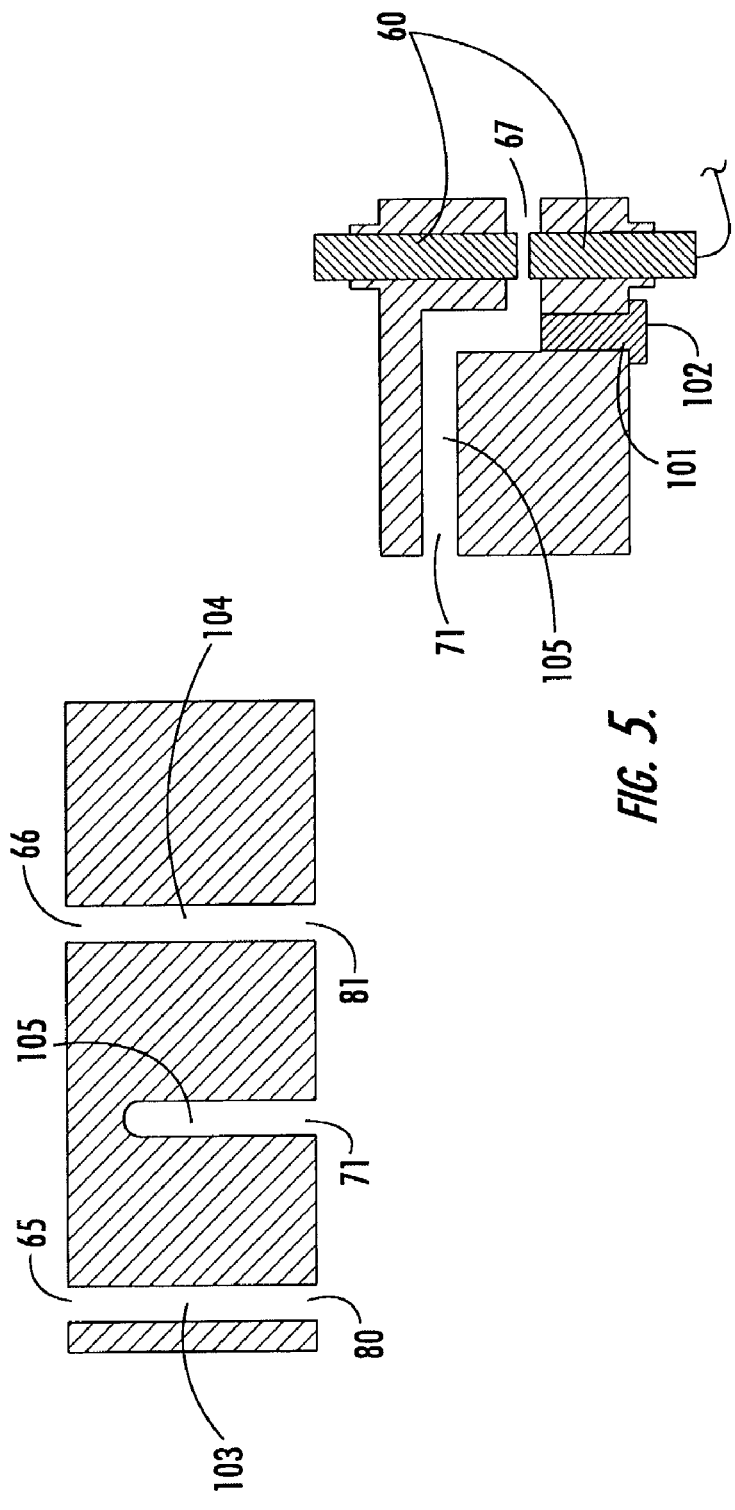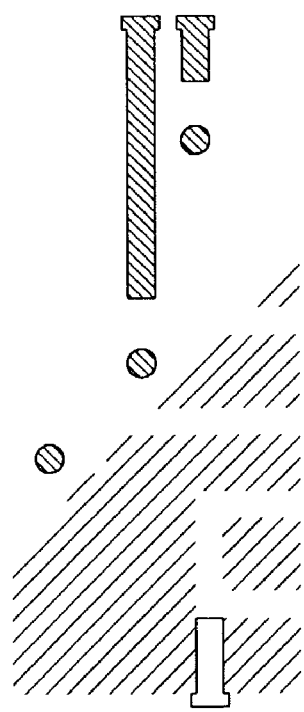

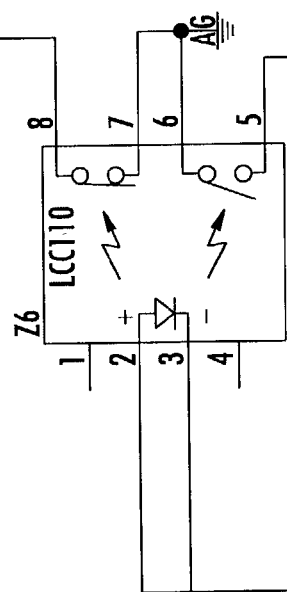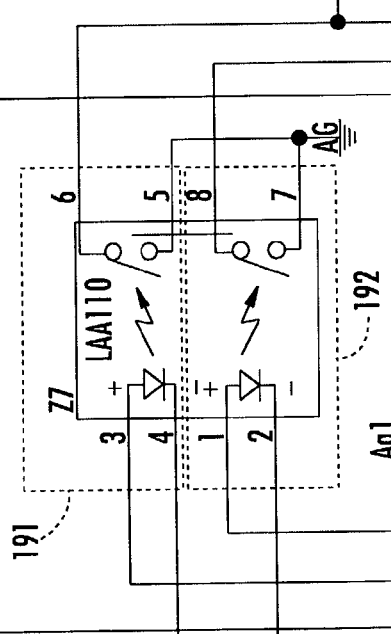
FIG. 15A.

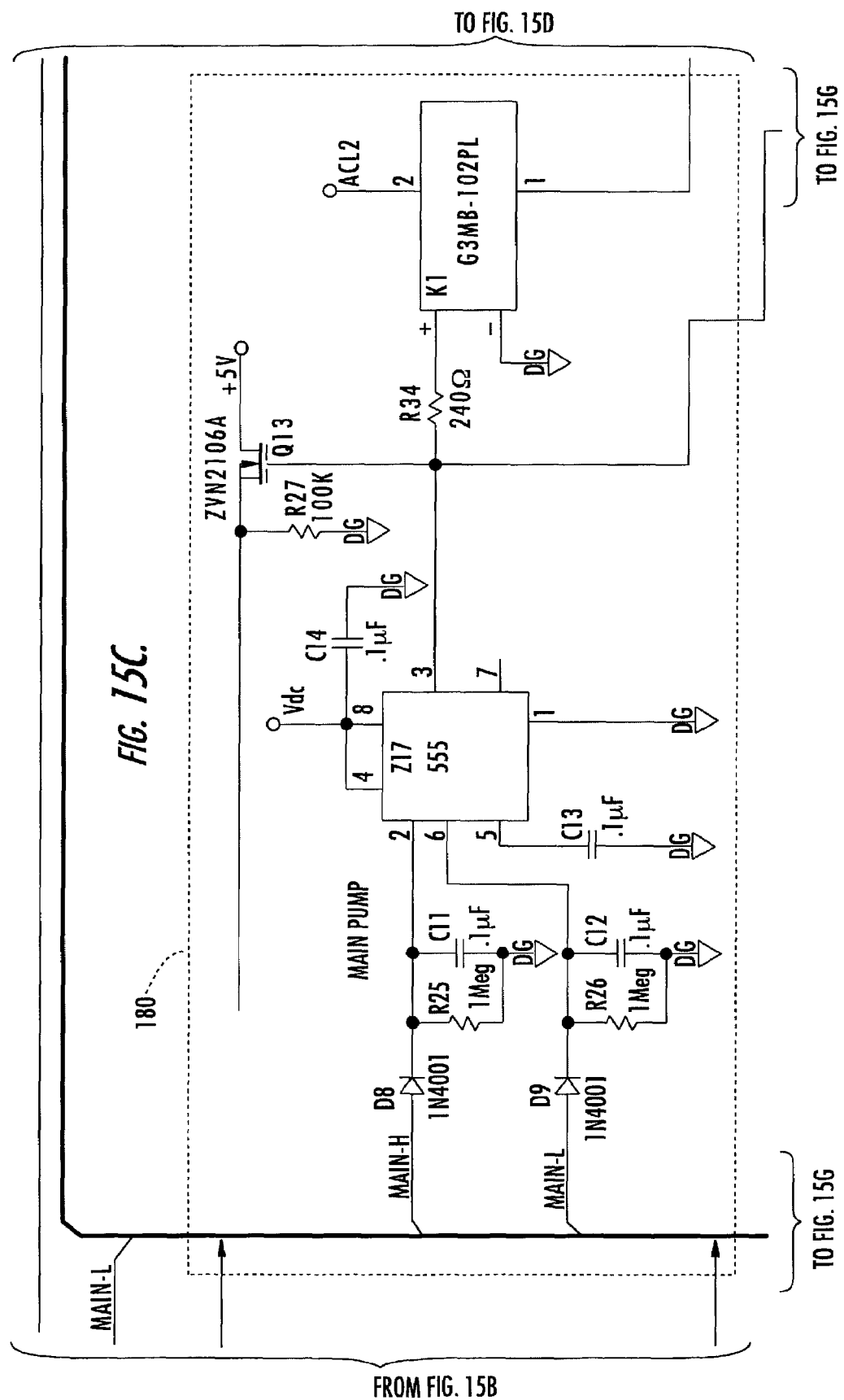

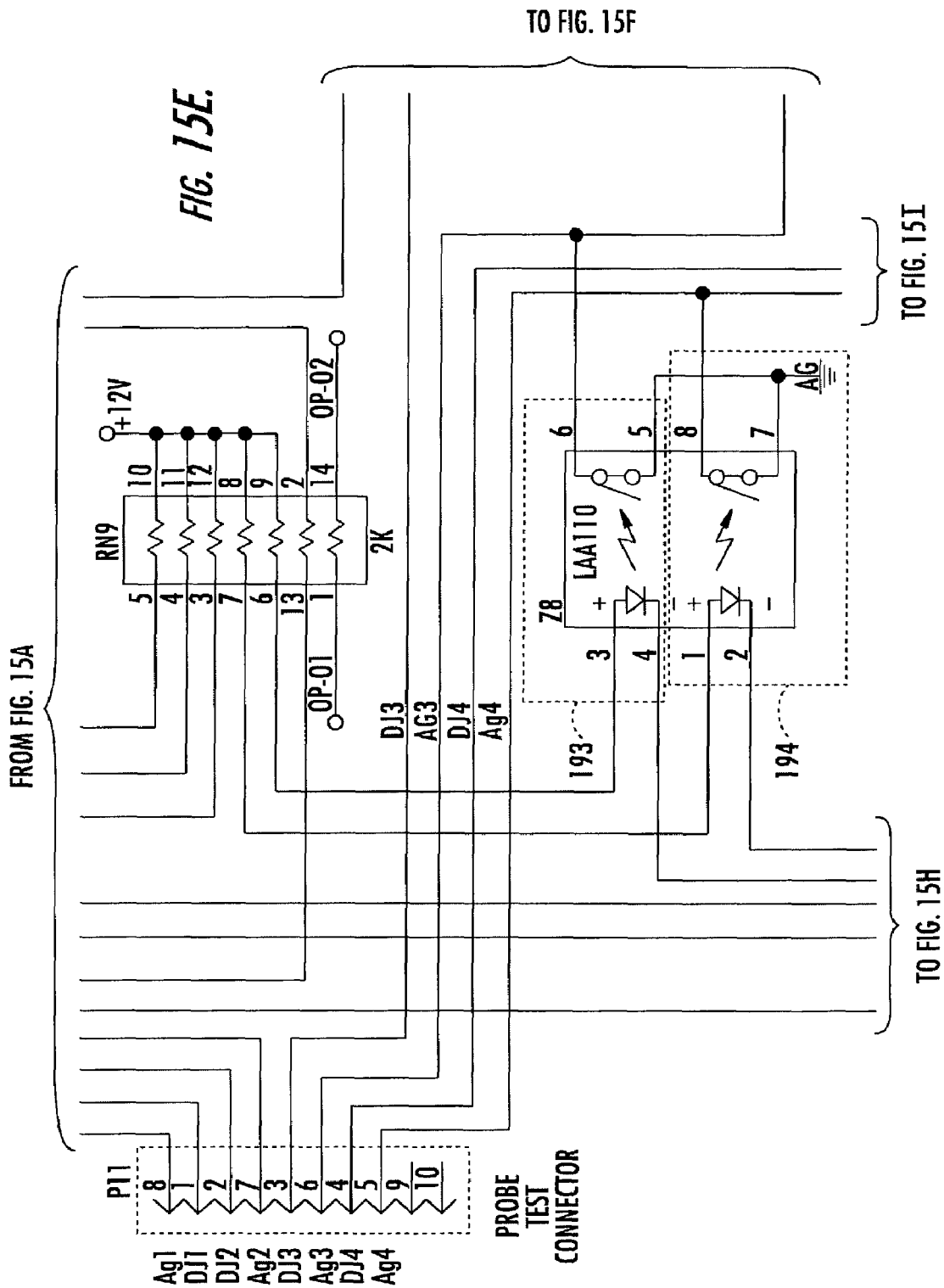

FIG. 15F.

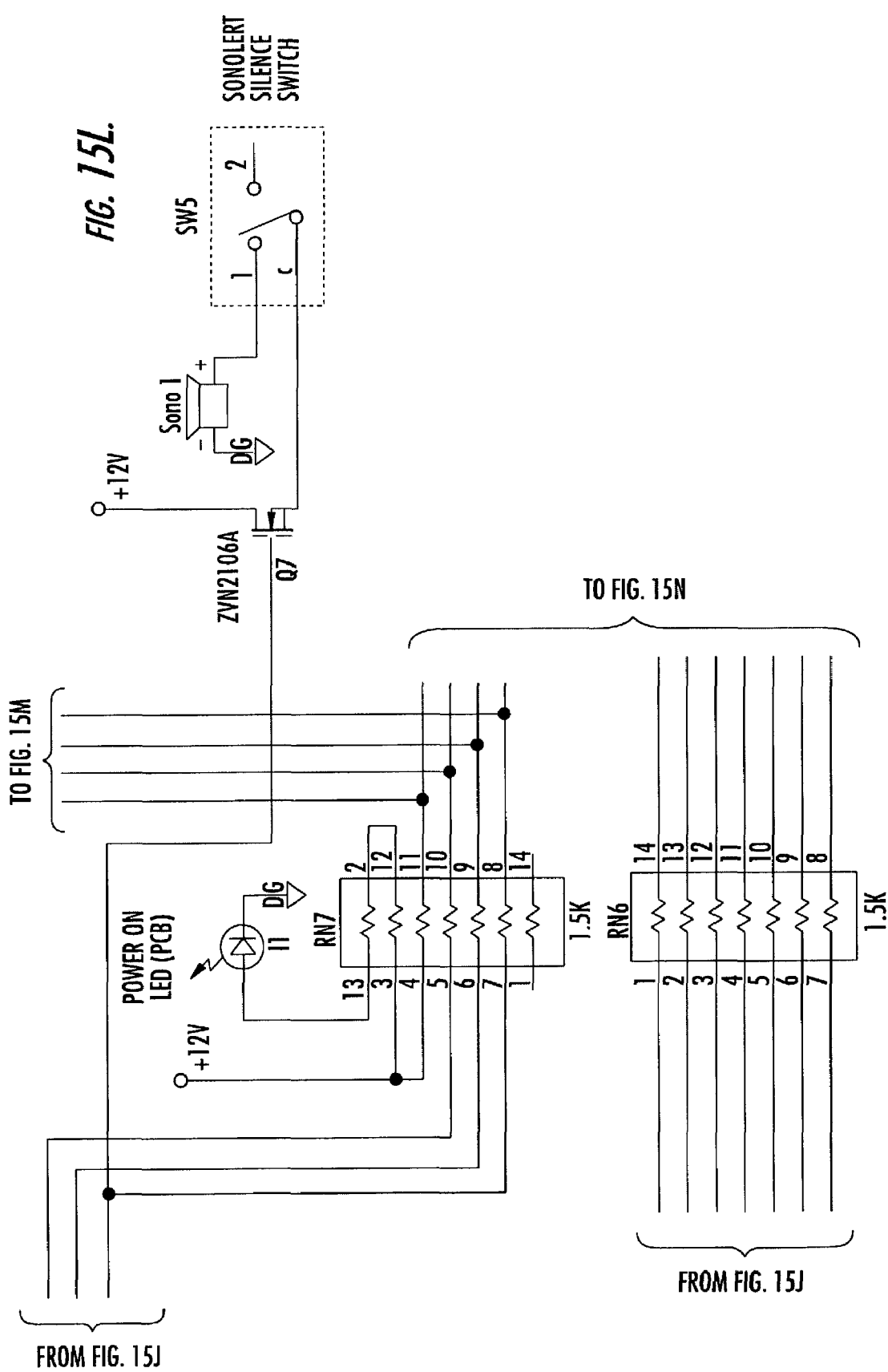

US 6,991,669 B1

SYSTEM AND METHOD FOR SILVER RECOVERY AND MONITORING

CROSS-REFERENCE TO RELATED APPLICATION

This is a nonprovisional U.S. patent application that relates to and claims the benefit of the filing date of U.S. Provisional Patent Application Ser. No. 60/298,648, filed on Jun. 15, 2001.

REFERENCE TO COMPUTER PROGRAM LISTING APPENDIX

The source code of an embodiment of the software described in this patent application is provided in a computer program listing appendix stored as a text file on a recordable compact disc (CD-R) filed with this application. The file is named TFXCODE.TXT and is incorporated herein by reference. The file has a date of creation of Jun. 12, 2002 and a size of 53 kilobytes.

BACKGROUND OF THE INVENTION

Silver is contained in a fluid waste product generated during traditional photographic film development processes. Such processes are currently used in a variety of industries, including but not limited to the health care industry, as in the development of radiological film, the print media industry, as in the development of photographs on film to be printed in publications such as newspapers, and in the commercial development of photographs taken on film by the general public. Regulations promulgated and enforced by the U.S. Environmental Protection Agency require that the concentration of silver in fluids drained into the environment as waste be limited to 5 parts per million. However, industry routinely fails to comply with this regulation, frequently draining fluids into the environment that contain hundreds and even thousands of parts per million of silver.

This compliance failure is typically caused by use of primitive silver recovery and monitoring systems. One such primitive system is a bucket of steel wool in which raw photographic fixer fluid containing silver is collected and filtered before being drained into the environment. In the ideal case, in such systems the iron atoms in the steel wool react with the silver ions in the fixer fluid to replace the steel wool with solids of silver and silver compounds, causing the resulting iron ions to flow out of the system into the environment with fluid containing no more than 5 parts per million of silver. However, in practice, such systems rarely if ever result in compliant drain fluid because the actual silver concentration in the fluid drained into the environment is never monitored, and the steel wool is spent very quickly, thereby causing unfiltered, high-silver-concentration, non-compliant fixer fluid to be drained into the environment.

A system and method for silver recovery and monitoring is disclosed below.

BRIEF DESCRIPTION OF THE DRAWINGS

FIG. 4 is a cross-sectional view of the sensor block illustrated in FIG. 3, taken through line 4—4 in FIGS. 3C and 3D;

FIG. 5 is a cross-sectional view of the sensor block illustrated in FIG. 3, taken through line 5—5 in FIGS. 3C and 3D;

FIG. 6 is a cross-sectional view of the sensor block illustrated in FIG. 3, taken through line 6—6 in FIGS. 3C and 3D;

DETAILED DESCRIPTION

Figure 1:
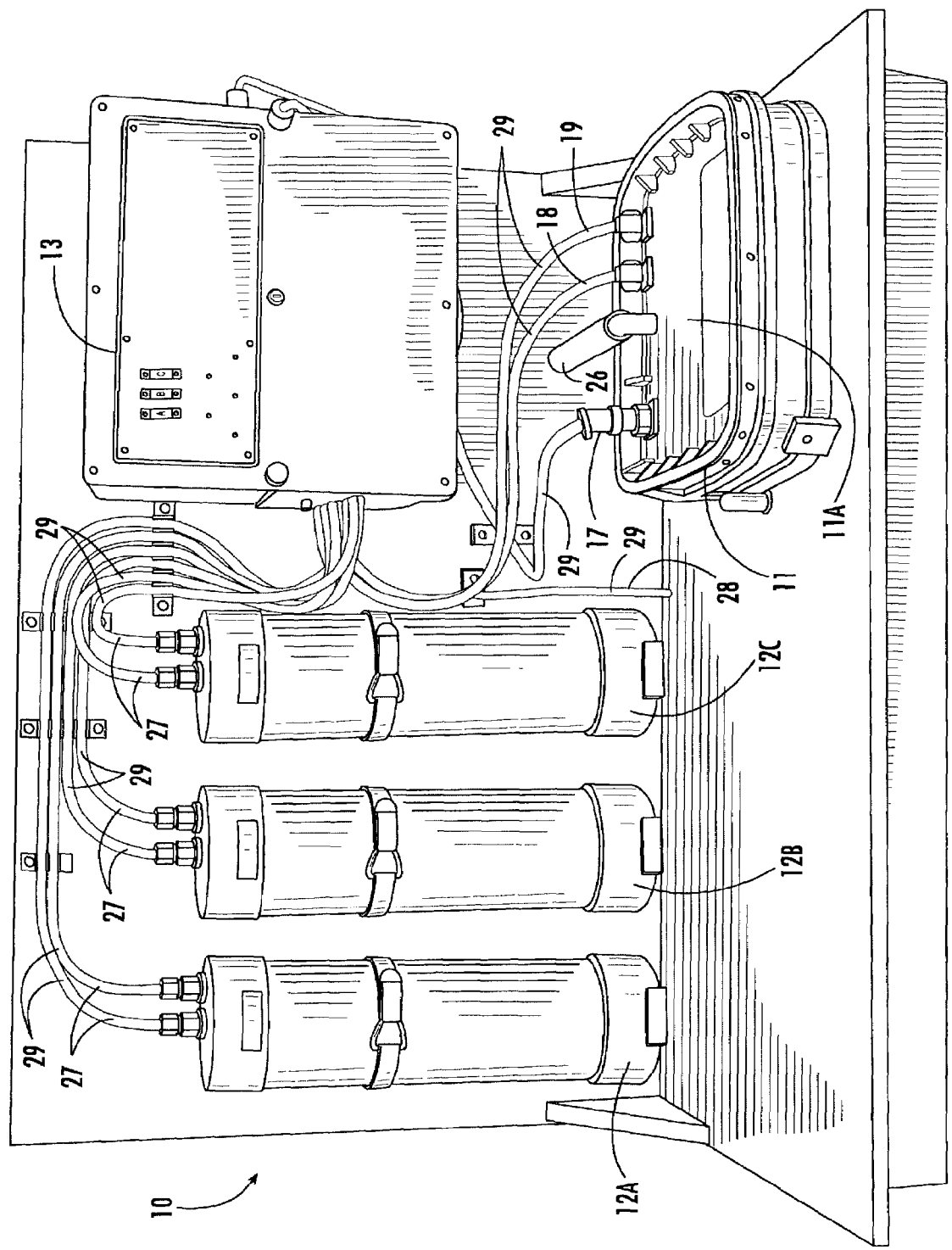
FIG. 1 is a perspective view of a system according to an embodiment of the invention.
Figure 2:
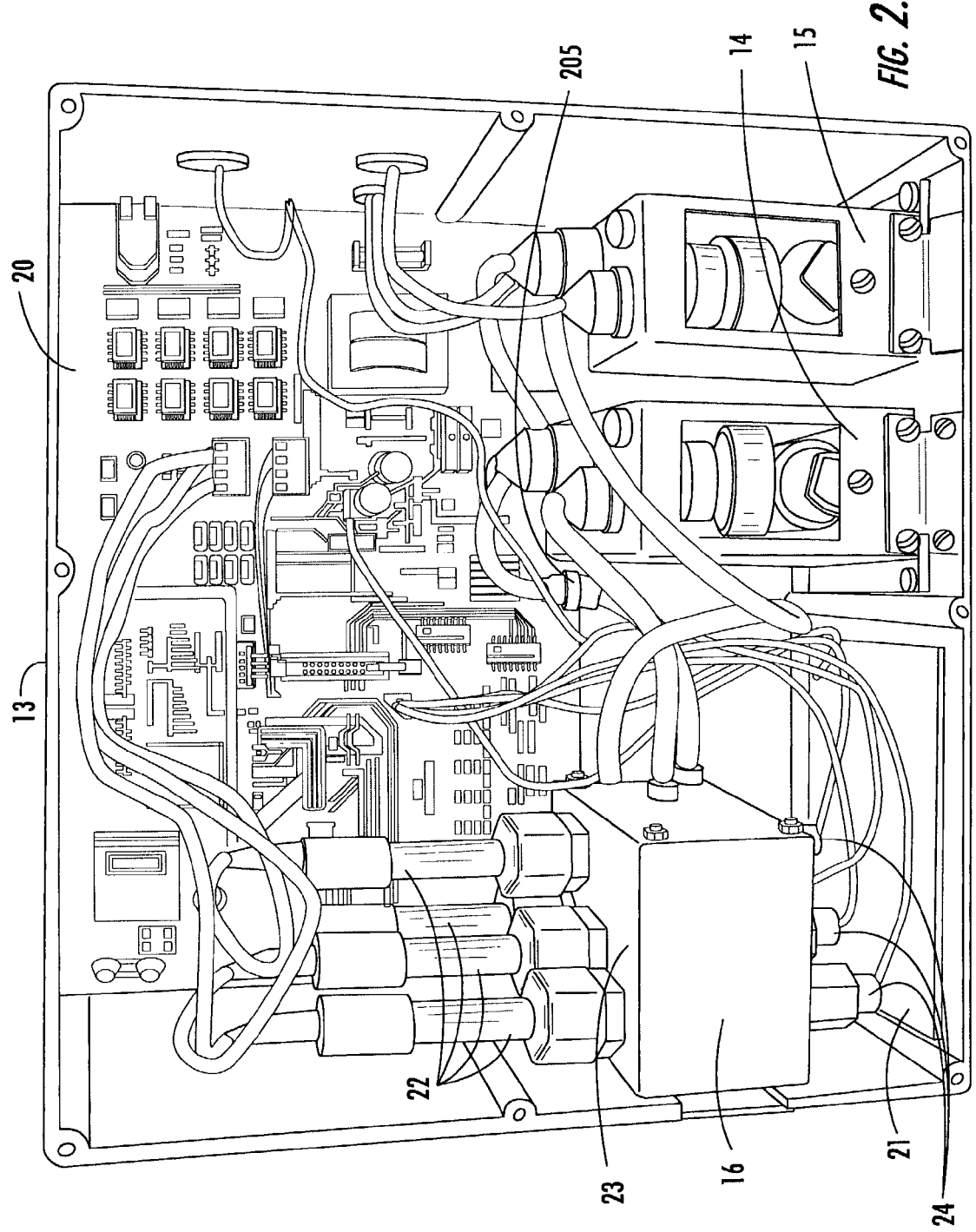
FIG. 2 is a perspective view of the interior of a unit box of the system illustrated in FIG. 1.
Figure 3:
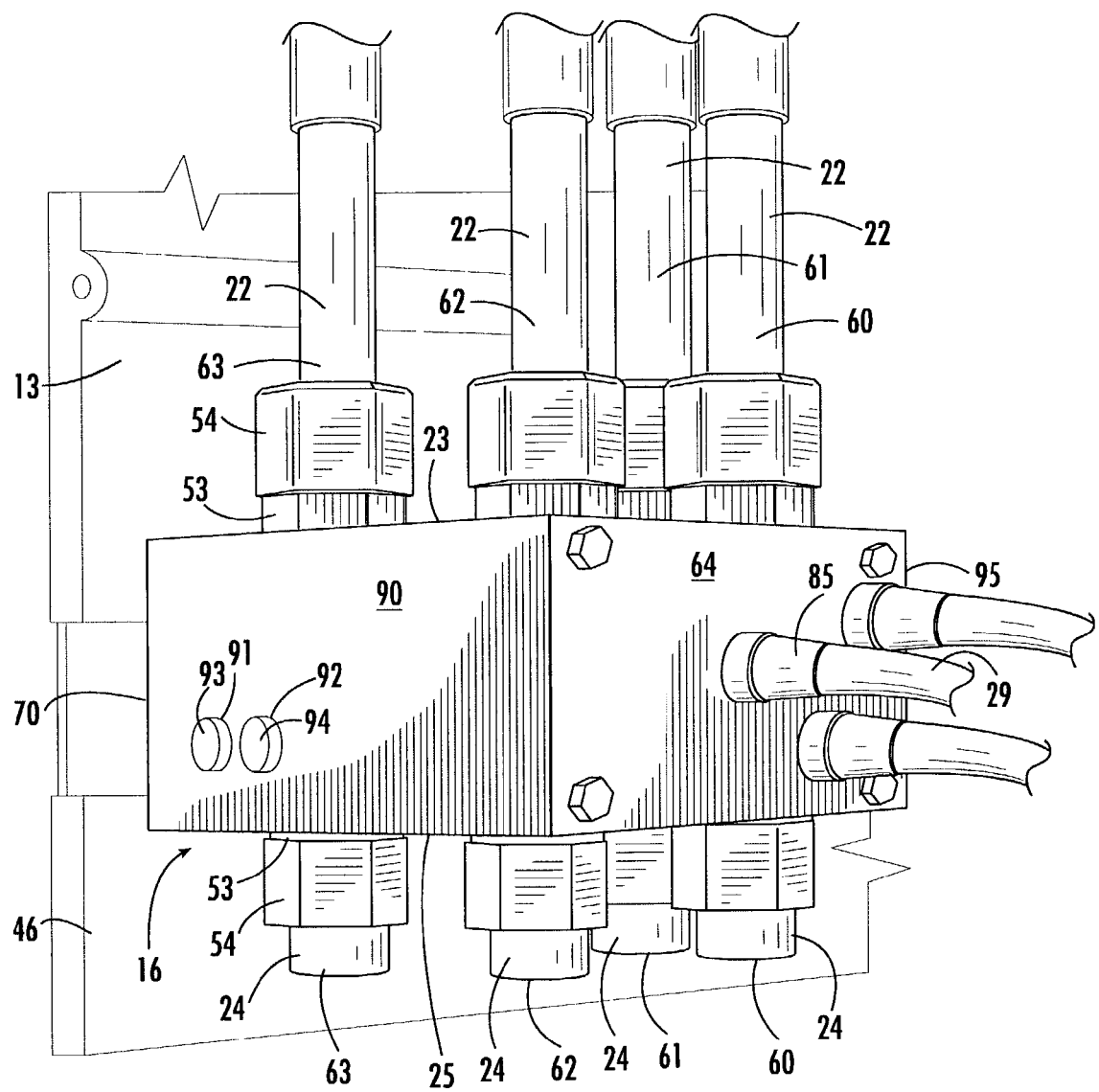
FIG. 3 is a perspective view of a sensor block housed in the unit box illustrated in FIG. 2.

Referring now to the drawings, an embodiment of a silver recovery and monitoring system in accordance with the invention is shown broadly at reference numeral 10 in FIG. 1. The system 10 includes a receptacle 11 in which silver-laden raw fluid (not shown) is collected, three filter canisters 12A, 12B, 12C and a unit box 13. A fluid level sensor 17 (FIG. 7) is mounted through a lid 11A of the receptacle 11. The receptacle lid 11A also carries a main pump outlet hose 18, an auxiliary pump outlet hose 19, and a drain pipe 26. As shown in FIG. 2, the unit box 13 contains a main fluid pump 14, an auxiliary fluid pump 15, a sensor block 16, a main printed circuit board 20 ("the main PCB") with multiple components mounted thereon, and a leak detector printed circuit board 21 ("the leak detector PCB") oriented beneath the sensor block 16 and wired to the main PCB 20. As shown in FIG. 3, four double-junction, silver- selective probes 22 are mounted on a top surface 23 of the sensor block 16. Four corresponding silver probes 24 are mounted on a bottom surface 25 of the sensor block 16 in registration with the double-junction probes 22.

As shown in FIG. 1, the fluid connections among the elements of the system 10, including the connections between the receptacle 11, the pumps 14, 15, the sensor block 16, and the filter canisters 12A, 12B, 12C are achieved with hoses formed of flexible plastic tubing 29. In particular, FIG. 1 illustrates the main pump outlet hose 18, the auxiliary pump outlet hose 19, six hoses 27 connecting the filter canisters 12A, 12B, 12C to the sensor block 16 (FIG. 2) in the unit box 13, and a drain hose 28 that connects the sensor block 16 (FIG. 2) to the drain (not shown).

Looking at the basic elements of the system 10 shown in FIGS. 1, 2, and 3, the pumps 14, 15 are model 16200-011x-112 T-011 pumps manufactured by Gorman-Rupp Industries, 180 Hines Avenue, Bellville, OH 44813 (www-.gripumps.com). The double-junction probes 22 are model 5731403CT-X18T probes manufactured by Phoenix Electrode, 6103 Glenmont, Houston, Tex. 77081 (www.phoenixelectrode.com). The corresponding silver probes 24 are model 6520141-X18T probes, also manufactured by Phoenix Electrode. The components mounted on the main PCB 20 are readily available from a wide range of electronics manufacturers and suppliers, except as otherwise discussed below. The filter canisters 12A, 12B, 12C, the unit box 13, the sensor block 16, the fluid level sensor 17, the main PCB 20, the plastic tubing 29 and the leak detector PCB 21 are proprietary elements of the illustrated embodiment of the invention and are described below.

Figure 3A:
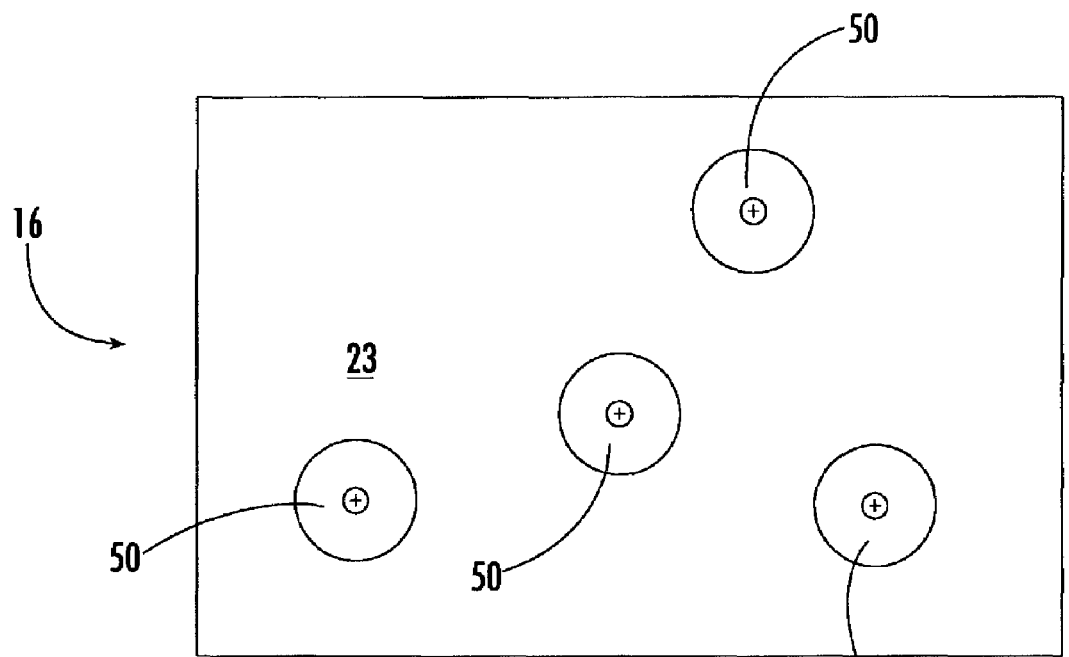
FIG. 3A is a plan view of the top surface of the sensor block illustrated in FIG. 3, with the sensors removed.
Figure 3B:
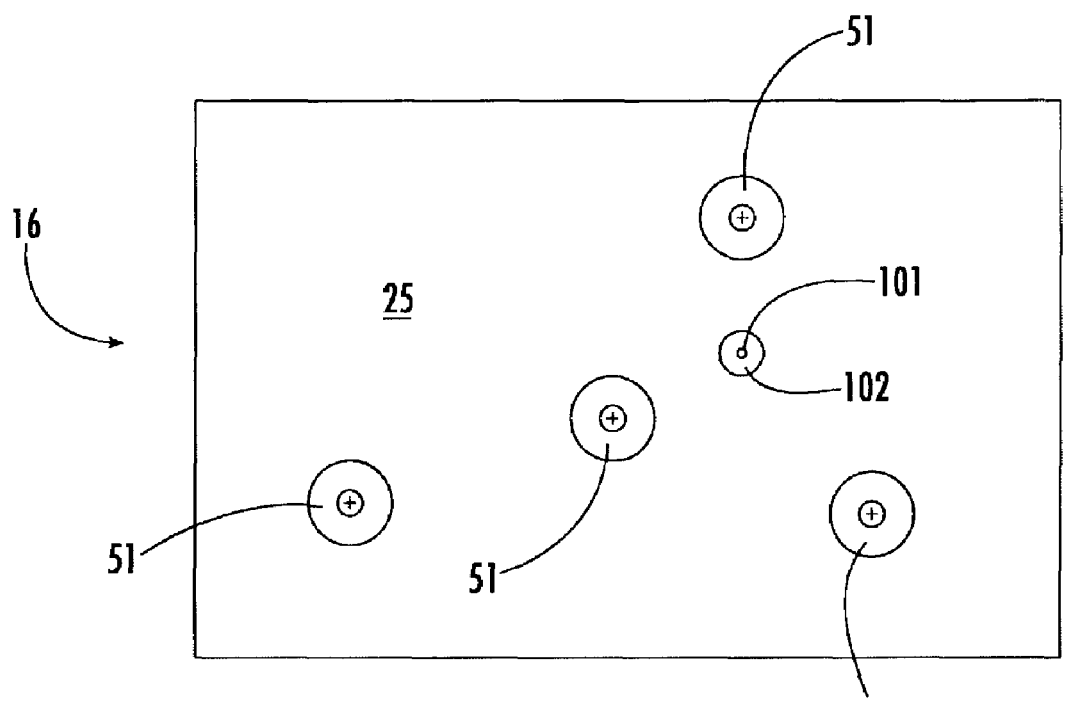
FIG. 3B is a plan view of the bottom surface of the sensor block illustrated in FIG. 3, with the sensors removed.

Turning now to FIG. 3, a perspective view of the sensor block 16 of the system 10 is shown. The sensor block 16 is a substantially rectangular prism attached to an interior surface of a left-hand wall 46 of the unit box 13 (FIG. 2) and is manufactured out of white acetal copolymer plastic or similar plastic. A plurality of passages (FIGS. 4, 5, 6) are drilled into the interior of the sensor block 16 to accommodate the necessary fluid flow within the sensor block 16. These passages are accessed by a plurality of ports drilled into four external surfaces 23, 25, 64, 70 of the sensor block 16. Referring now to FIG. 3A, a top surface 23 of the sensor block 16 defines four ports 50 for receiving the four double-junction probes 22 (FIG. 3). As shown in FIG. 3B, a bottom surface 25 of the sensor block defines four ports 51 for receiving the four silver probes 24 (FIG. 3). An externally threaded plastic fitting 53 (FIG. 3) is inserted into each of the top surface ports 50 (FIG. 3A) and the bottom surface ports 51 (FIG. 3B) of the sensor block 16 and are sealed to the respective top and bottom surfaces 23, 25 of the sensor block 16. The fittings 53 are each provided with a mating internally threaded and gasketed nut 54. The double-junction probes 22 and the silver probes 24 are installed into the sensor block 16 by being inserted through the fittings 53 carried by the top surface ports 50 and the bottom surface ports 51, respectively, of the sensor block 16. The nuts 54 are then tightened into place on the fittings 53 surrounding the probes 22, 24.

The top surface ports 50 are aligned in registration with the bottom surface ports 51 such that each of the four double-junction probes 22 is coaxial with one of the four silver probes 24. This orientation of the double-junction probes 22 relative to the silver probes 24 enables the double-junction probes 22 and the silver probes 24 to contact substantially the same portion of fluid substantially simultaneously within the sensor block 16, as is necessary to obtain accurate signals transmitted by the double-junction probes 22 and the silver probes 24 to the main PCB 20 (FIG. 2). In this way, the four double-junction probes 22 and the four silver probes 24 act as four probe pairs, with each probe pair acting as a silver sensor. Therefore, the illustrated embodiment includes four silver sensors, a first silver sensor 60, a second silver sensor 61, a third silver sensor 62, and a fourth silver sensor 63 (FIG. 3). As discussed below, the invention encompasses embodiments that include as few as one silver sensor.

Figure 3C:
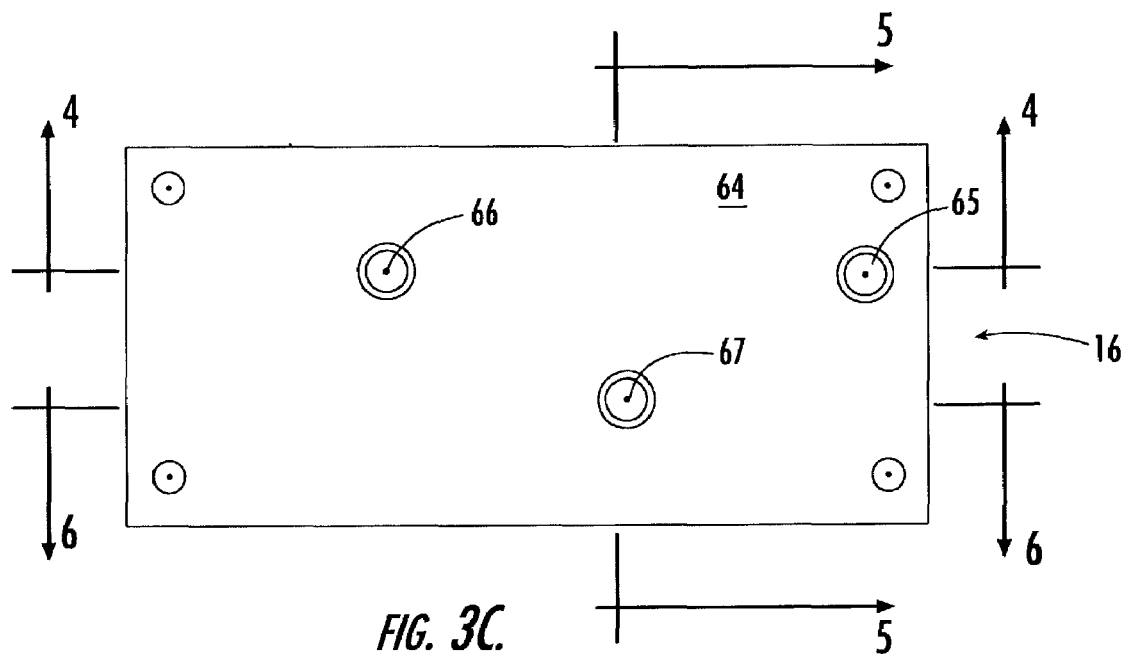
FIG. 3C is an elevational view of the right-hand surface of the sensor block illustrated in FIG. 3, with the taps and hoses removed.
Figure 3D:
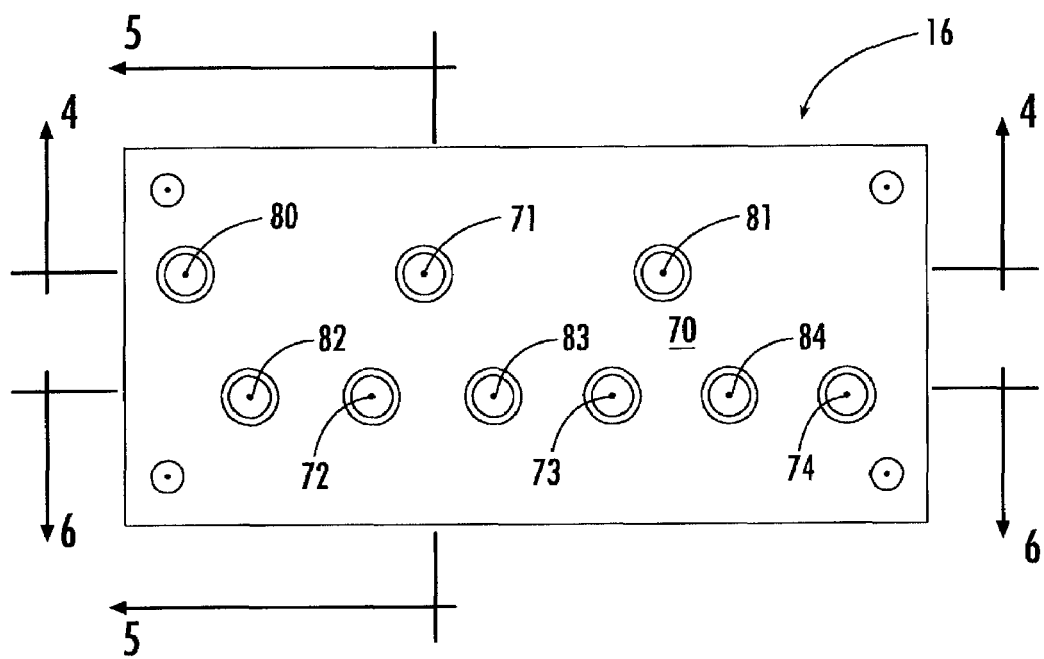
FIG. 3D is an elevational view of the left-hand surface of the sensor block illustrated in FIG. 3, with the taps and hoses removed.

Turning now to FIG. 3C, the right-hand surface 64 of the sensor block 16 defines three ports: outlet ports 65, 66 and an inlet port 67. As shown in FIG. 3D, the left-hand surface 70 of the sensor block 16 defines nine ports: outlet ports 71, 72, 73, 74, and inlet ports 80, 81, 82, 83, 84. A hose-barb tap 85 (FIG. 3) is inserted and sealed into each of the right-hand surface and left-hand surface ports 65–67, 71–74, 80–84. The taps 85 are configured such that the flexible plastic tubing 29 (FIG. 3) may be slid over each tap 85 and clamped thereto to direct the fluid flowing into and out of the sensor block 16. When the sensor block 16 is properly installed into the unit box 13 (FIG. 2), the taps 85 in the nine left-hand surface ports 71–74, 80–84 of the sensor block 16 each extend through one of nine openings in the left-hand wall 46 (FIG. 10) of the unit box 13.

Figure 3E:
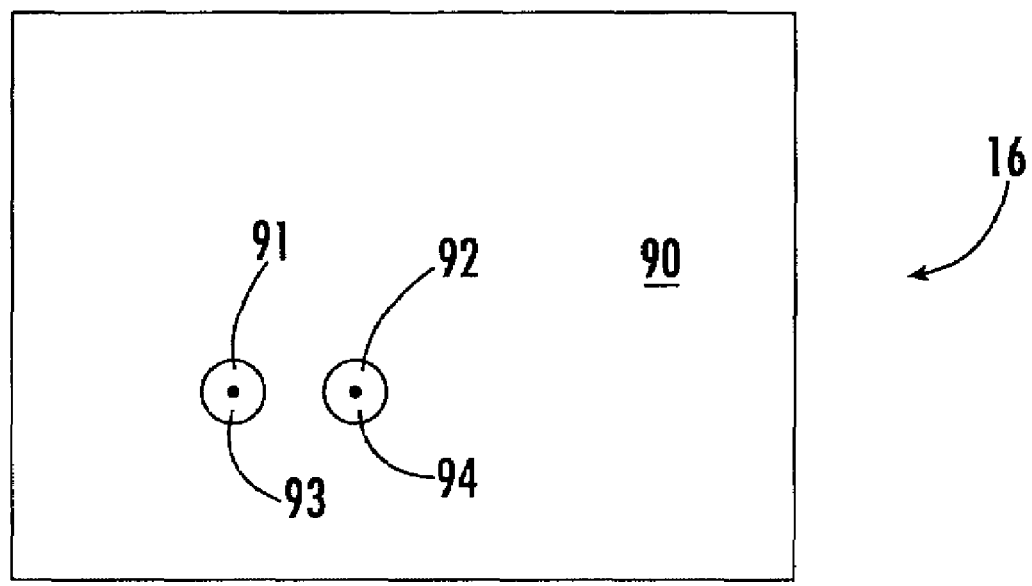
FIG. 3E is an elevational view of the front surface of the sensor block illustrated in FIG. 3.
Figure 3F:
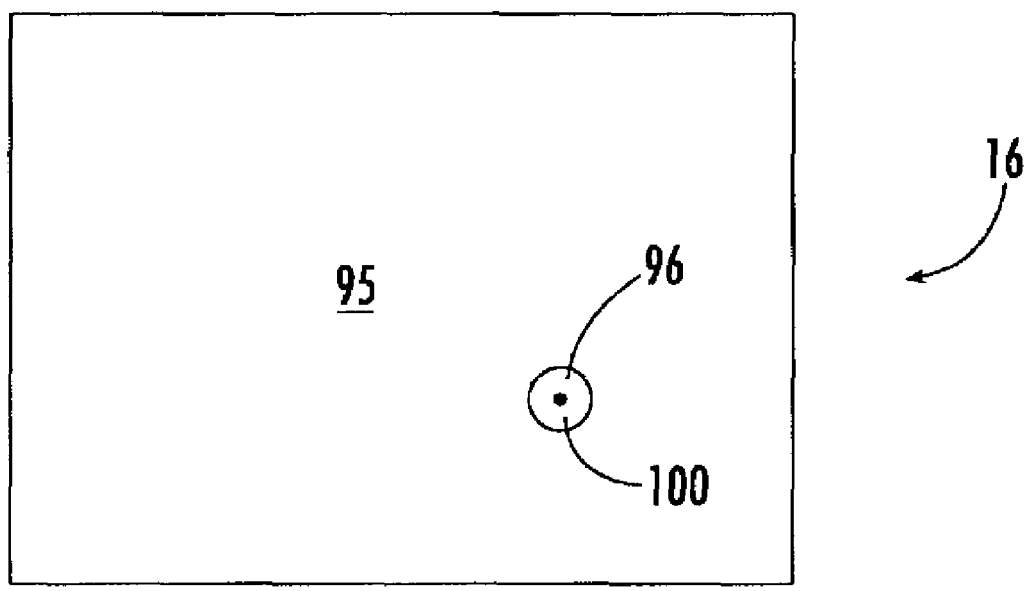
FIG. 3F is an elevational view of the rear surface of the sensor block illustrated in FIG. 3.

As shown in FIGS. 3E and 6, the front surface 90 of the sensor block 16 defines two ports 91, 92. These ports 91, 92 are drilled into the sensor block 16 to help define the passages within the sensor block 16, as further described below, and are plugged and sealed with plastic rods 93, 94 in order to prevent undesired fluid leakage from the passages in the sensor block 16. Similarly, as shown in FIGS. 3F and 6, the rear surface 95 of the sensor block 16 defines one port 96 that is also drilled into the sensor block 16 to help define the passages within the sensor block 16, but is also plugged and sealed with a plastic rod 100 to prevent leakage. Finally, as shown in FIGS. 3B and 5, the bottom surface 25 of the sensor block 16 defines one port 101 that is drilled into the sensor block to help define the passages within the sensor block 16 but is plugged and sealed with a plastic rod 102 to prevent leakage.

The passages through the interior of the sensor block 16 are illustrated in FIGS. 4, 5, and 6, and are configured as follows. As shown in FIG. 4, the inlet port 80 defined by the left-hand surface 70 and the outlet port 65 defined by the right-hand surface 64 are connected by a first passage 103 through the sensor block 16. The inlet port 81 defined by the left-hand surface 70 and the outlet port 66 defined by the right-hand surface 64 are connected by a second passage 104 through the sensor block 16. Referring now to FIG. 5, the inlet port 67 defined by the right-hand surface 64 and the outlet port 71 defined by the left-hand surface 70 are connected by a third passage 105 through the sensor block 16 that contains the first silver sensor 60. Portions of the third passage 105 are also shown in FIGS. 4 and 6. As shown in FIG. 6, the remaining passages through the sensor block 16 connect pairs of ports defined by the left-hand surface 70 of the sensor block 16, and each such passage contains a silver sensor. Specifically, the inlet port 82 and the outlet port 72 defined by the left-hand surface 70 are connected by a fourth passage 106 through the sensor block 16 that contains the second silver sensor 61. The inlet port 83 and the outlet port 73 defined by the left-hand surface 70 are connected by a fifth passage 110 through the sensor block 16 that contains the third silver sensor 62. The inlet port 84 and the outlet port 74 defined by the left-hand surface 70 are connected by a sixth passage 111 through the sensor block 16 that contains the fourth silver sensor 63.

Figure 7:
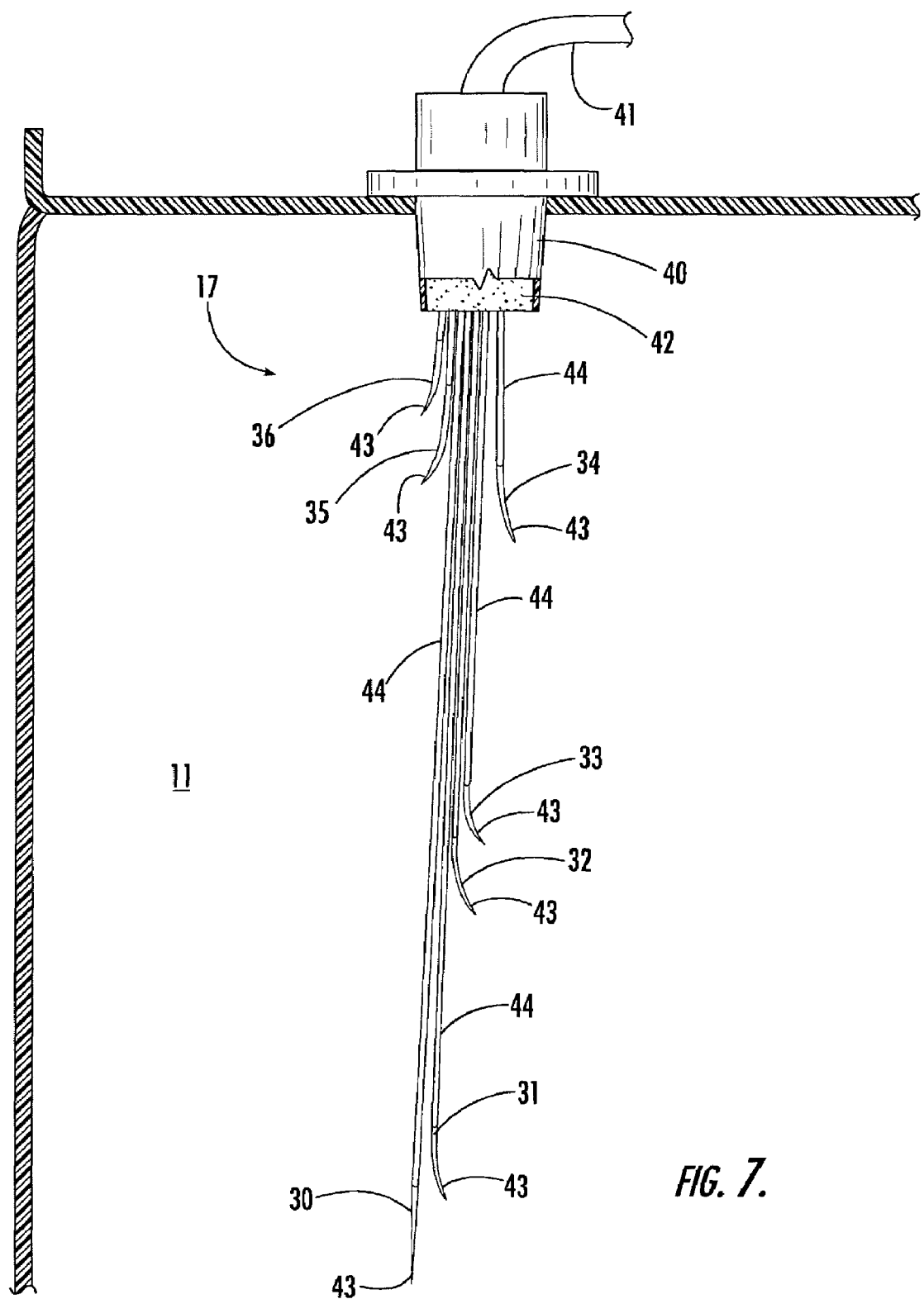
FIG. 7 is a fragmentary perspective view of the receptacle illustrated in FIG. 1, with the interior of the receptacle shown to illustrate a fluid level sensor.

Turning now to FIG. 7, the fluid level sensor 17 is shown in the receptacle 11. The fluid level sensor 17 is comprised of seven electrically conductive metal rods 30-36, including a ground rod 30, a main pump shutoff rod 31, an auxiliary pump shutoff rod 32, a main pump activation rod 33, an auxiliary pump activation rod 34, an overflow indicator shutoff rod 35, and an overflow indicator activation rod 36. The rods 30–36 are comprised of 316 stainless steel and are mounted to a connector 40 which interfaces the rods 30–36 with a seven-conductor cable 41. The interior of the connector 40 is protected from the raw fluid in the receptacle 11 by a hard plastic shield 42 molded and adhered to the connector 40.

Each of the rods 30–36 includes an exposed, fluid-contacting portion 43. The remaining portion of each rod 30–36 is covered by an electrically insulating plastic sheath 44. The fluid-contacting portion 43 of each rod 30–36 is a unique distance from the connector 40 such that no two fluid-contacting portions 43 of the rods 30–36 are aligned. As the level of raw fluid in the receptacle 11 rises, the raw fluid comes into contact with the successively higher fluid-contacting portions 43 of the rods 30–36. The first fluid-contacting portion 43 contacted by the raw fluid in the receptacle 11 is the fluid contacting portion 43 of the ground rod 30. As the raw fluid continues to rise in the receptacle 11 and contacts the successively higher fluid- contacting portions 43 of the rods 30–36, the electrically conductive nature of the raw fluid completes an electrical circuit by electrically coupling the ground rod 30 to the successive rods 31–36 having fluid-contacting portions 43 above the fluid-contacting portion 43 of the ground rod 30. As the raw fluid contacts the fluid-contacting portions 43 of the rods 30–36, electrical pump control signals are transmitted to the main PCB 20 (FIG. 2), thereby activating and deactivating the pumps 14, 15 and an overflow indicator 45 (FIG. 8) as follows.

When the fluid level in the receptacle 11 rises to contact the main pump activation rod 33, the fluid level sensor 17 transmits an electrical pump control signal to the main PCB 20 (FIG. 2), which in turn activates the main pump 14 (FIG. 2). If the fluid level in the receptacle 11 continues to rise despite the continued operation of the main pump 14, and the fluid level rises to contact the auxiliary pump activation rod 34, the fluid level sensor 17 transmits an electrical pump control signal to the main PCB 20, which in turn activates the auxiliary pump 15 (FIG. 2). If the fluid level in the receptacle 11 still continues to rise despite the continued operation of both the main pump 14 and the auxiliary pump 15, and the fluid level rises to contact the overflow indicator activation rod 36, the fluid level sensor 17 transmits an electrical pump control signal to the main PCB 20, which in turn illuminates the overflow indicator 45 (FIG. 8) and informs a remote monitoring station 210 (FIG. 15) of the overflow.

When the fluid level in the receptacle 11 falls below the overflow indicator shutoff rod 35 after the fluid has contacted the overflow indicator activation rod 36, the main PCB deactivates the overflow indicator 45. Similarly, when the fluid level in the receptacle 11 falls below the auxiliary pump shutoff rod 33 after the fluid has contacted the auxiliary pump activation rod 34, the main PCB deactivates the auxiliary pump 15. Finally, when the fluid level in the receptacle 11 falls below the the main pump shutoff rod 31 after the fluid has contacted the main pump activation rod 32, the main PCB deactivates the main pump 14. In each of these instances, the particular element (overflow indicator, auxiliary pump, main pump) begins to operate when the respective activation rod has been contacted by the fluid and continues to operate until the fluid falls below the respective shutoff rod.

Figure 8:
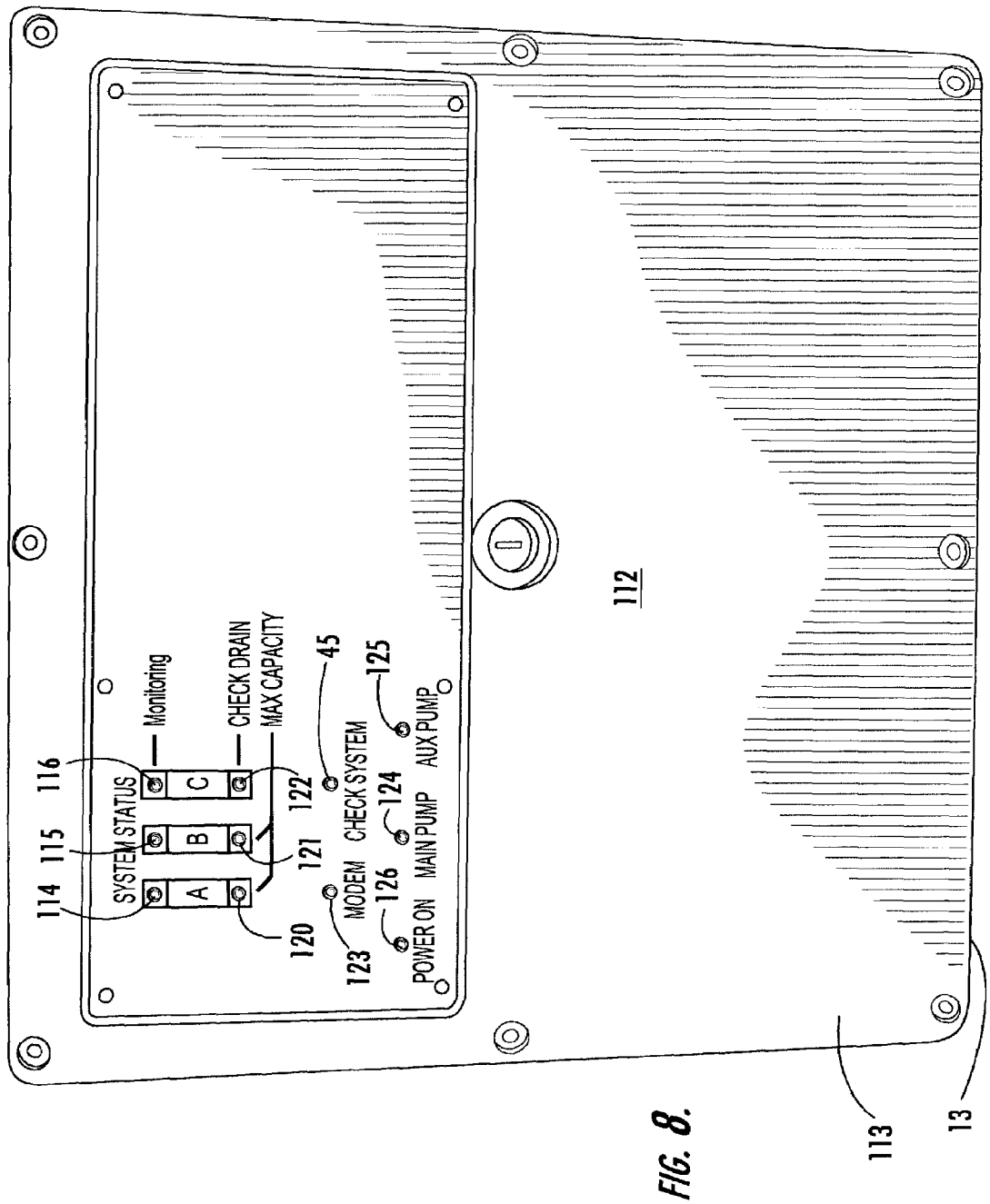
FIG. 8 is an elevational view of the front panel of the unit box illustrated in FIG. 1.

Referring now to FIG. 8, an exterior surface 112 of a front panel 113 of the unit box 13 is shown. The front panel 113 of the unit box 13 is removably attached to the unitary remainder of the unit box 13 with fasteners to permit access to the interior of the unit box 13 for assembly and maintenance purposes. Eleven light-emitting diodes ("LEDs") are visible through the exterior surface 113 of the front panel 112 of the unit box 13. These LEDs are controlled by the main PCB 20 (FIG. 2), as discussed below, through a front panel LED printed circuit board ("the front panel LED PCB") (not shown). The front panel LED PCB is mounted on the interior surface (not shown) of the front panel 113 of the unit box 13 and is electrically connected to the main PCB 20 with a ribbon cable (not shown) and connector (not shown). The front panel LED PCB merely contains electrical traces necessary to carry LED activation and deactivation signals from the main PCB 20 to the LEDs themselves, which are each mounted on a pair of leads (not shown) such that the LEDs are visible through openings in the front panel 112 of the unit box 13.

The LEDs on the front panel 112 notify a user of the status of the system 10 (FIG. 1). In particular, "monitoring" LEDs 114, 115, 116 are provided for each of the three filter canisters 12A, 12B, 12C (FIG. 1), respectively, to indicate when the silver concentration in the fluid leaving each of the filter canisters 12A, 12B, 12C is being monitored by the system 10. In addition, LEDs are provided for indicating when filter canisters 12A, 12B, 12C reach maximum capacity. For filter canisters 12A and 12B, these LEDs are designated "max capacity" LEDs 120, 121, respectively, on the exterior surface 112 of the front panel 113 of the unit box 13. The maximum capacity LED for the filter canister 12C is designated a "check drain" LED 122, as the drain must be checked when the filter canister 12C reaches maximum capacity in order to prevent fluid with an unacceptably high silver concentration from draining out of the system 10. When the modem 204 (FIGS. 15, 150; discussed below), the main pump 14 (FIG. 2), or the auxiliary pump 15 (FIG. 2) is operating, the respective "modem" LED 123, "main pump" LED 124, or "aux pump" LED 125 will illuminate. The remaining LEDs on the front panel 112 of the unit box 13 are the overflow indicator 45, which is an LED designated with the words "check system," and a "power on" LED 126, which remains illuminated while the system 10 is receiving power.

Figure 9:
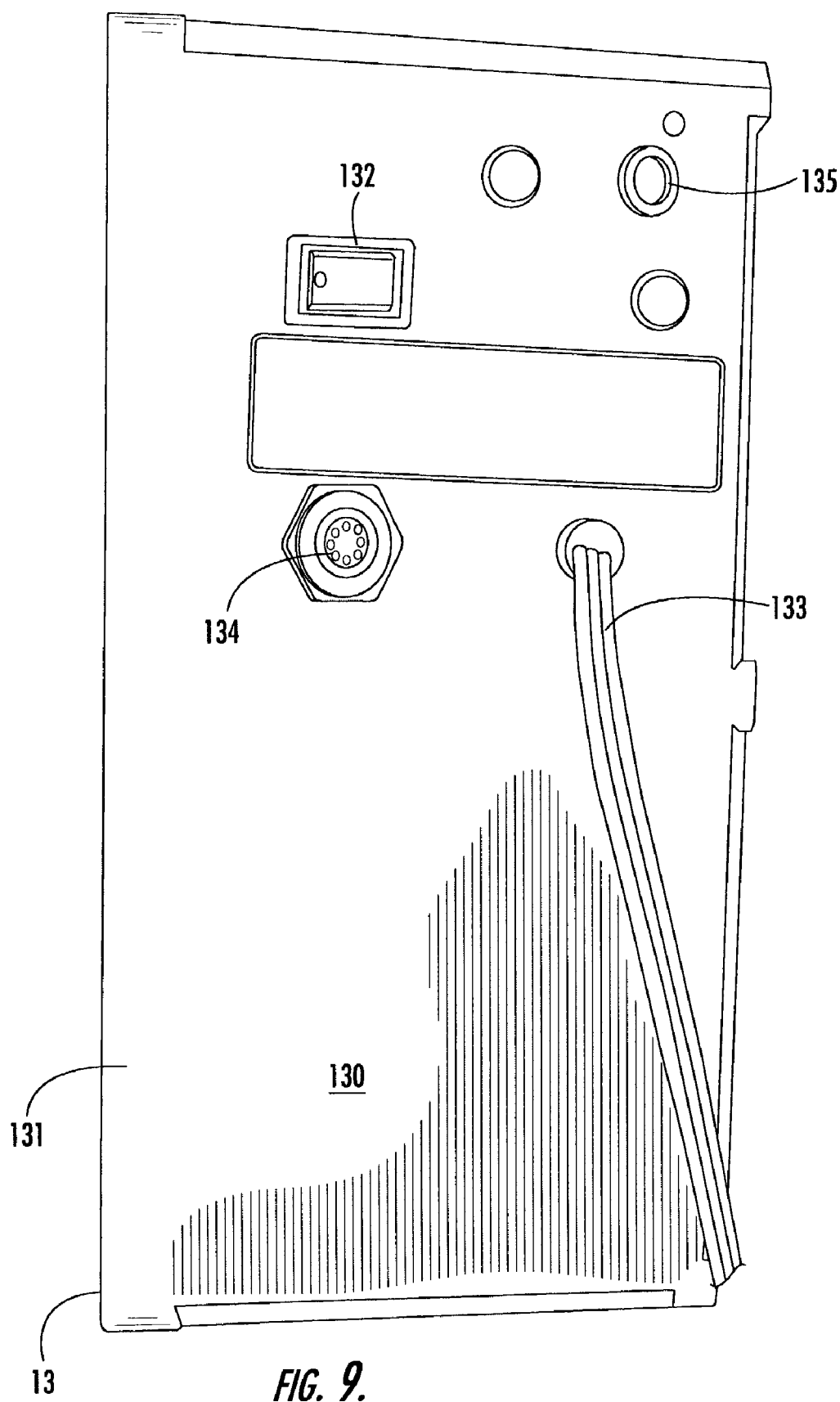
FIG. 9 is an elevational view of the right wall of the unit box illustrated in FIG. 1.

Turning now to FIG. 9, an exterior surface 130 of a right-hand wall 131 of the unit box 13 is shown. A pump power switch 132 (designated "pump power" with "on" and "off" positions marked), an AC power cord 133 for powering the system, a seven-conductor fluid level sensor input jack 134 designated "level sensor" for receiving a seven-pin connector carrying the electrical signals from the various rods of the fluid level sensor (FIG. 7), and a quarter-inch phone plug jack 135 through which a microprocessor 190 (FIGS. 15, 15Q–R, discussed below) may be externally programmed and controlled are mounted on the exterior surface 130 of the right-hand wall 131 of the unit box 13.

Figure 10:
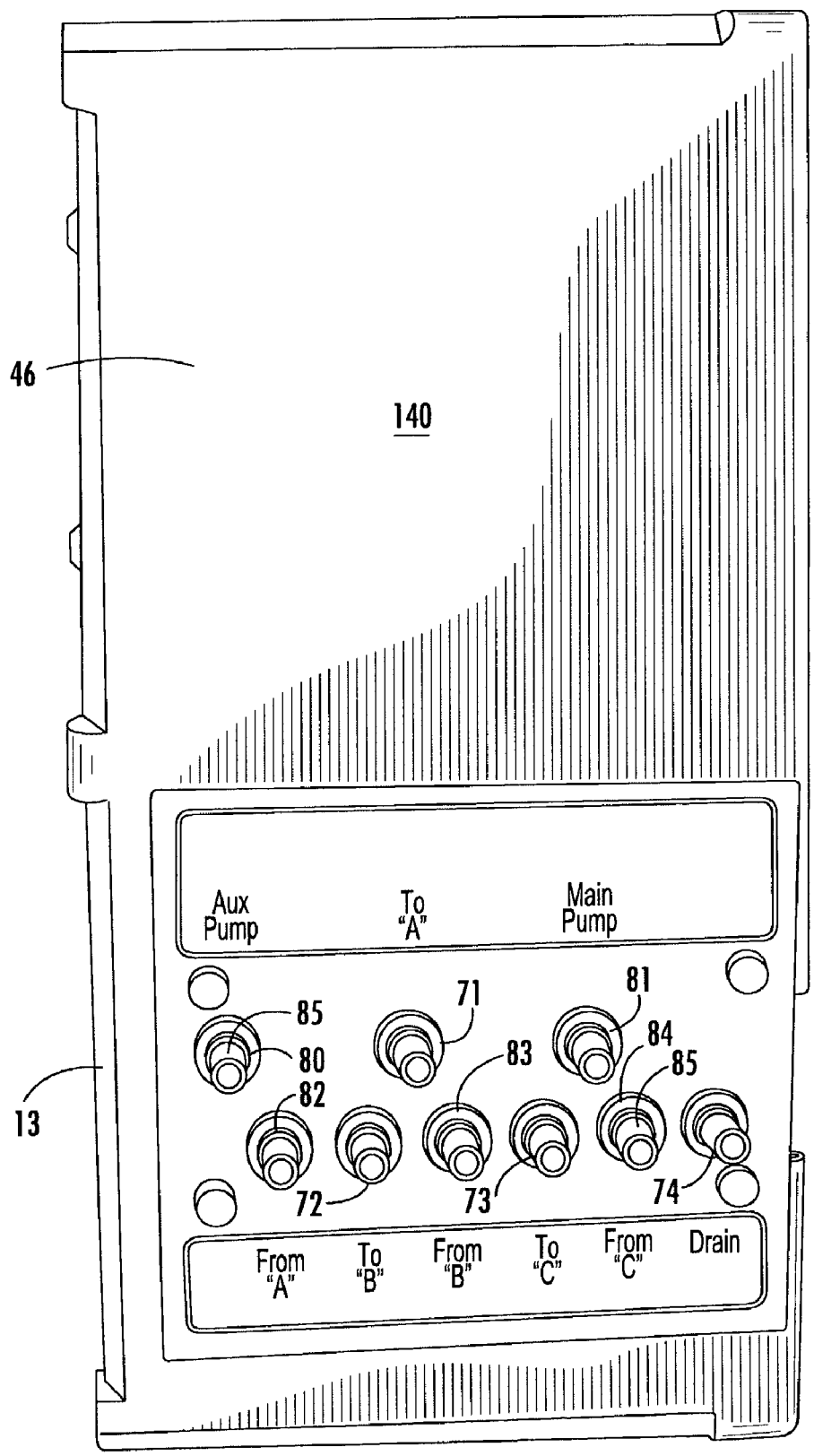
FIG. 10 is an elevational view of the left wall of the unit box illustrated in FIG. 1.

FIG. 10 illustrates an exterior surface 140 of the left-hand wall 46 of the unit box 13. As discussed above, the sensor block 16 is attached to the interior surface of the left- hand wall 46 of the unit box 13 such that the hose-barb taps 85 protruding from the left-hand surface ports 71–74, 80–84 of the sensor block 16 extend through openings in the left-hand wall 46 of the unit box 13. As shown in FIG. 10, the taps 85 extending from outlet ports 71, 72, 73, 74 are respectively designated on the exterior surface 140 of the left-hand wall 46 of the unit box 13 as "To "A"," "To "B"," "To "C"," and "Drain." Similarly, the taps 85 extending from inlet ports 80, 81, 82, 83, 84 are respectively designated on the exterior surface 140 of the left-hand wall 46 of the unit box 13 as "Aux Pump," "Main Pump," "From "A"," "From "B"," and "From "C"." The meanings of these designations are clarified in the discussion of the fluid flow in the system, as discussed below.

Figure 15:
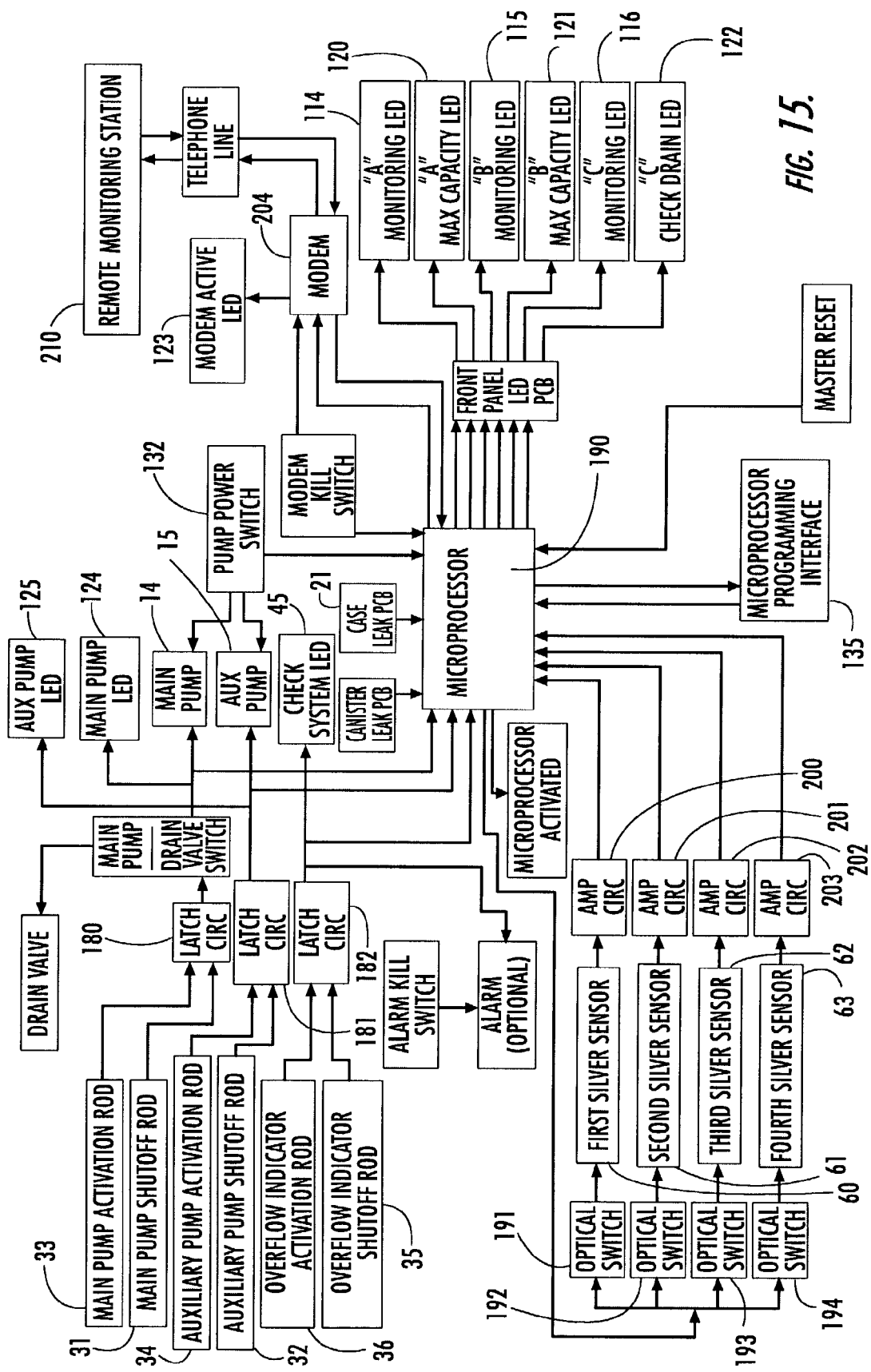
FIG. 15 is a block diagram generally illustrating the flow of electrical signals among various elements of the system.

A rear wall (not shown) of the unit box defines an opening through which a telephone cable (not shown) extends to be connected to a telephone jack (not shown) for facilitating telecommunication between the modem 204 (FIGS. 15, 150) and the remote monitoring station 210 (FIG. 15).

Figure 11:
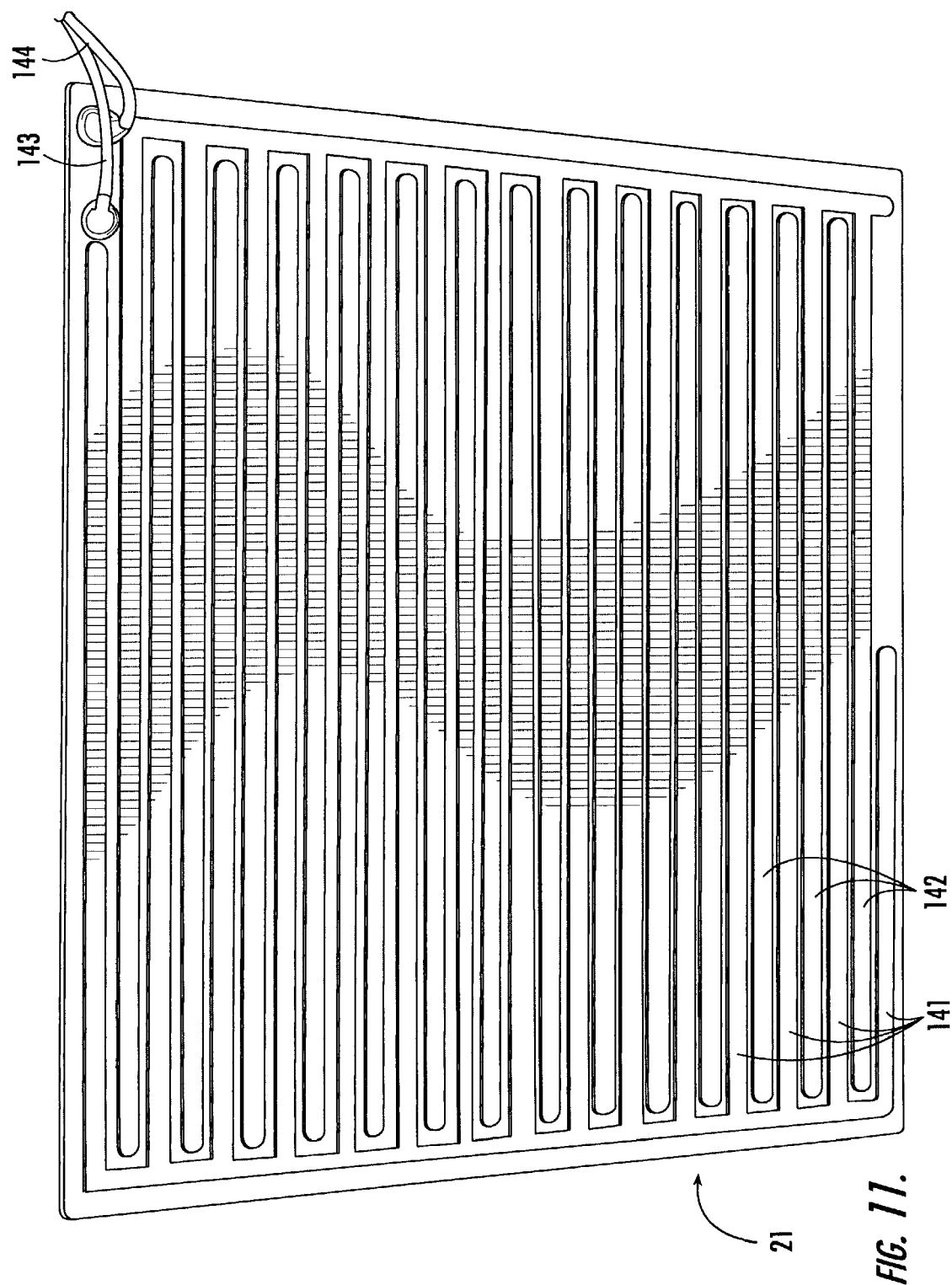
FIG. 11 is a perspective view of a leak detector printed circuit board housed in the unit box illustrated in FIG. 2.

FIG. 11 illustrates the leak detector PCB 21, which, as shown in FIG. 2, is loosely oriented on the floor of the interior of the unit box 13 below the sensor block 16 (FIG. 2). Two sets of electrically conductive traces 141, 142 are provided on the leak detector PCB 21, with the traces of each set 141, 142 alternating along the surface of the leak detector PCB 21. Wires 143, 144 are respectively connected to the trace sets 141, 142 and to the main PCB 20 (FIG. 2). One of the wires 143 consistently carries an electrical signal from the main PCB 20 to the leak detector PCB 21. If electrically conductive fluid leaks from the sensor block 16 or the pumps 14, 15 (FIG. 2) and contacts the leak detector PCB 21, such fluid will electrically connect the two trace sets 141, 142 on the leak detector PCB 21, causing the leak detector PCB 21 to pass an electrical signal along the other of the wires 144 back to the main PCB 20. As discussed below, the main PCB 20 will then automatically shut down the system until it is manually reset, thereby giving a user an opportunity to troubleshoot the leak before further fluid is pumped. A second, similar leak detector PCB (not shown) may be included in the system to detect leaks from the filter canisters 12A, 12B, 12C (FIG. 1).

Figure 12:
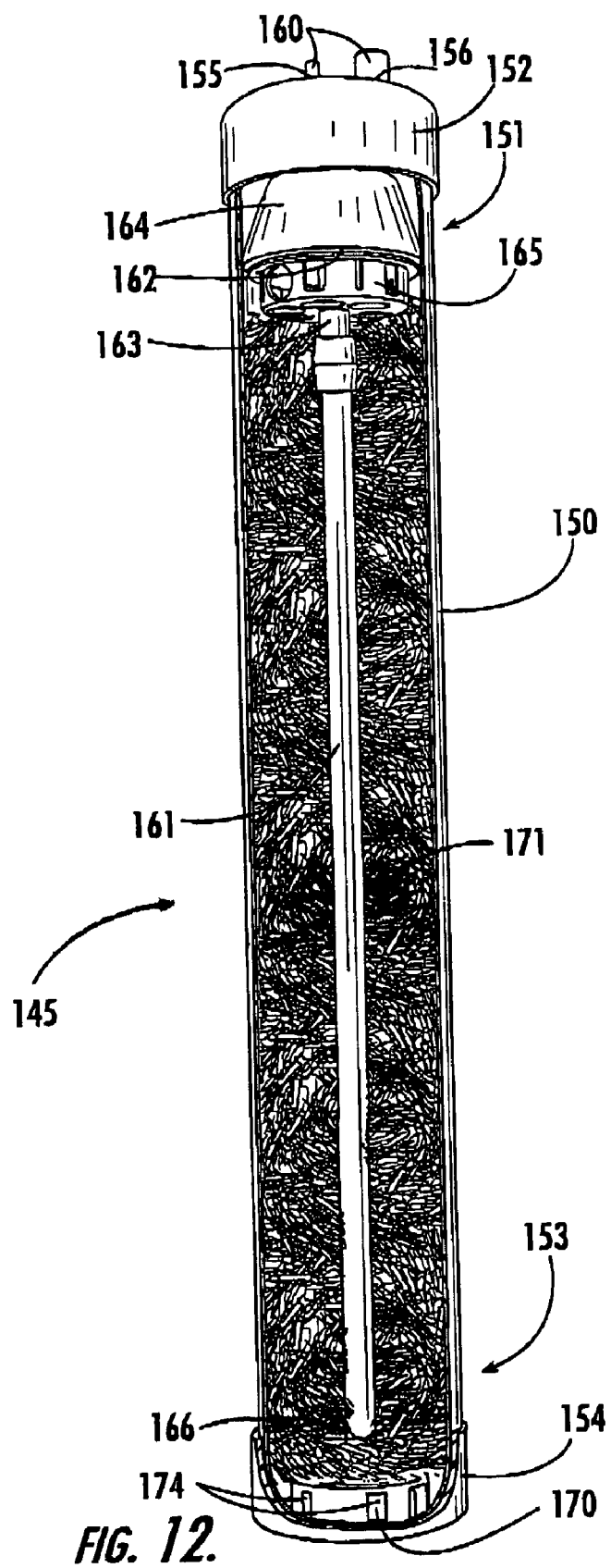
FIG. 12 is a cutaway perspective view of one of the filter canisters illustrated in FIG. 1.

The three filter canisters 12A, 12B, 12C (FIG. 1) are substantially identically structured and operate in a substantially identical manner. The following description therefore applies to all three filter canisters 12A, 12B, 12C. Referring now to FIG. 12, a cutaway view of one of the filter canisters 12A, 12B, 12C is shown generally at reference numeral 145. The canister 145 includes an elongate tube 150 with a top end 151 covered by a top end cap 152 and a bottom end 153 covered by a bottom end cap 154. The top end cap 152 defines a substantially centrally disposed fluid inlet 155 and a fluid outlet 156. The fluid inlet and outlet 155, 156 are each sealingly provided with fittings 160 on the top end cap 152 for receiving hoses (FIG. 1) carrying fluid. In the interior of the tube 150, a substantially centrally disposed downspout 161 is sealingly attached to the fluid inlet 155. The downspout 161 is carried through substantially centrally disposed openings 162, 163 in a citric acid toroid 164 and an upper settling chamber 165 adjacent to the top end 151 of the tube 150. The downspout 161 then extends along the length of the tube 150 until the downspout is adjacent to the bottom end 153 of the tube 150, where the downspout 161 is carried through a substantially centrally disposed opening 166 in a lower settling chamber 170 before terminating near the bottom end 153 of the tube 150.

Figure 13:
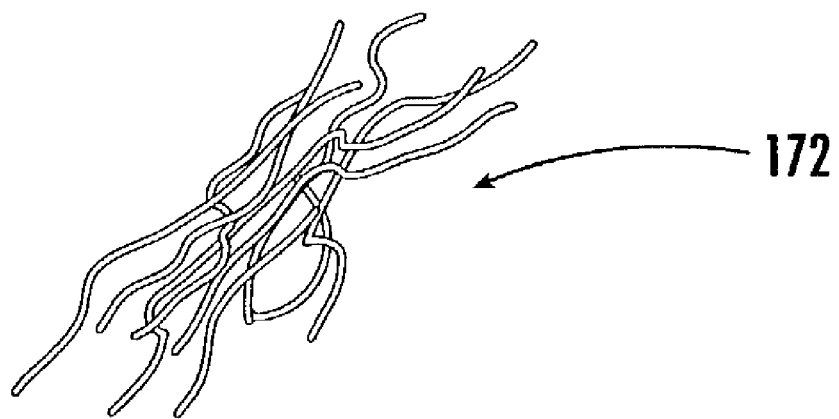
FIG. 13 is a perspective view of iron wool fibers of an iron fragment mix contained in the filter canister illustrated in FIG. 12.
Figure 14:
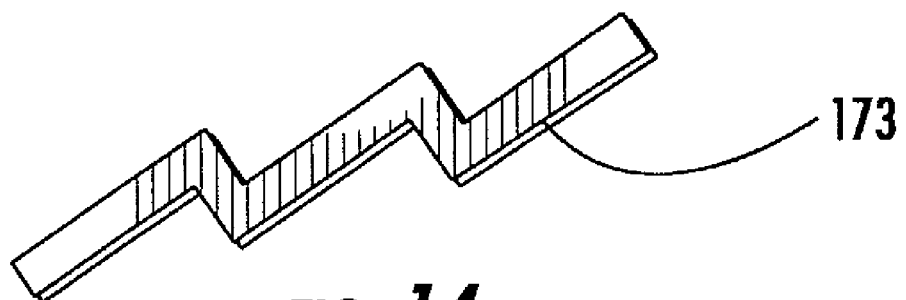
FIG. 14 is a perspective view of one of the corrugated iron strips of the iron fragment mix contained in the filter canister illustrated in FIG. 12.

A loose mix of iron fragments 171 is contained in the tube 150 between the upper and lower settling chambers 165, 170. The iron fragment mix 171 comprises two types of iron fragments, which are shown in FIGS. 13 and 14. As shown in FIG. 13, fibers of iron wool 172 are one type of iron fragment in the iron fragment mix 171 (FIG. 12). FIG. 14 illustrates a corrugated iron strip 173, the other type of iron fragment in the iron fragment mix 171. The iron wool fibers 172 and the corrugated iron strips 173 are mixed according to a predetermined ratio to form the iron fragment mix 171 used in the tube 150. Specifically, the iron fragment mix 171 is comprised of a 2:3 ratio by volume of iron wool fibers 172 to corrugated iron strips 173.

Referring again to FIG. 12, the filter canister 145 functions as follows. Fluid (not shown) enters the fluid inlet 155 at the top end 151 of the tube 150 and flows down through the downspout 161 and into the lower settling chamber 170. The lower settling chamber 170 is provided with a plurality of openings 174 that facilitate fluid flow at the bottom end 153 of the tube. However, the openings 174 in the lower settling chamber 170 are sufficiently small to prevent the coarse iron fragment mix 171 from impinging upon fluid flow within the lower settling chamber 170. As fluid flow at the bottom end 153 of the tube increases, the fluid begins to flow up through the iron fragment mix 171 toward the top end 151 of the tube 150.

When the fluid contacts the iron fragment mix 171, a chemical reaction occurs between silver ions in the fluid and iron atoms in the iron fragment mix 171. Specifically, as is known to those of ordinary skill in the art, the iron atoms "donate" electrons to the silver ions to cause the silver ions to become complete silver atoms. The silver atoms then form solids of silver and silver compounds such as silver sulfides and silver oxide. The iron ions resulting from the reaction are then entrained in the fluid passing through the iron fragment mix 171 and silver solids have replaced the iron fragment mix. The silver is thereby removed or "filtered" from the fluid passing through the tube 150, leaving silver solids in the tube 150.

The filtered fluid flows toward the top end 151 of the tube 150, where it flows into the upper settling chamber 165, which substantially separates the iron fragment mix 171 (and the silver solids resulting from the reaction) from the filtered fluid, thereby facilitating the flow of filtered fluid at the top end 151 of the tube 150 in a manner similar to that described above relative to the lower settling chamber 170 at the bottom end 153 of the tube 150. The fluid then flows over the citric acid toroid 164, which reacidifies the fluid to prevent buildup of iron hydroxide and other residues in the system. The manufacture and operation of the citric acid toroid 164 is described in greater detail in commonly-owned U.S. Provisional Patent Application Ser. No. 60/375,142, filed Apr. 24, 2002 and incorporated herein by reference. After flowing over the citric acid toroid 164, the filtered fluid exits the canister 145 through the fluid outlet 156.

Figure 15B:
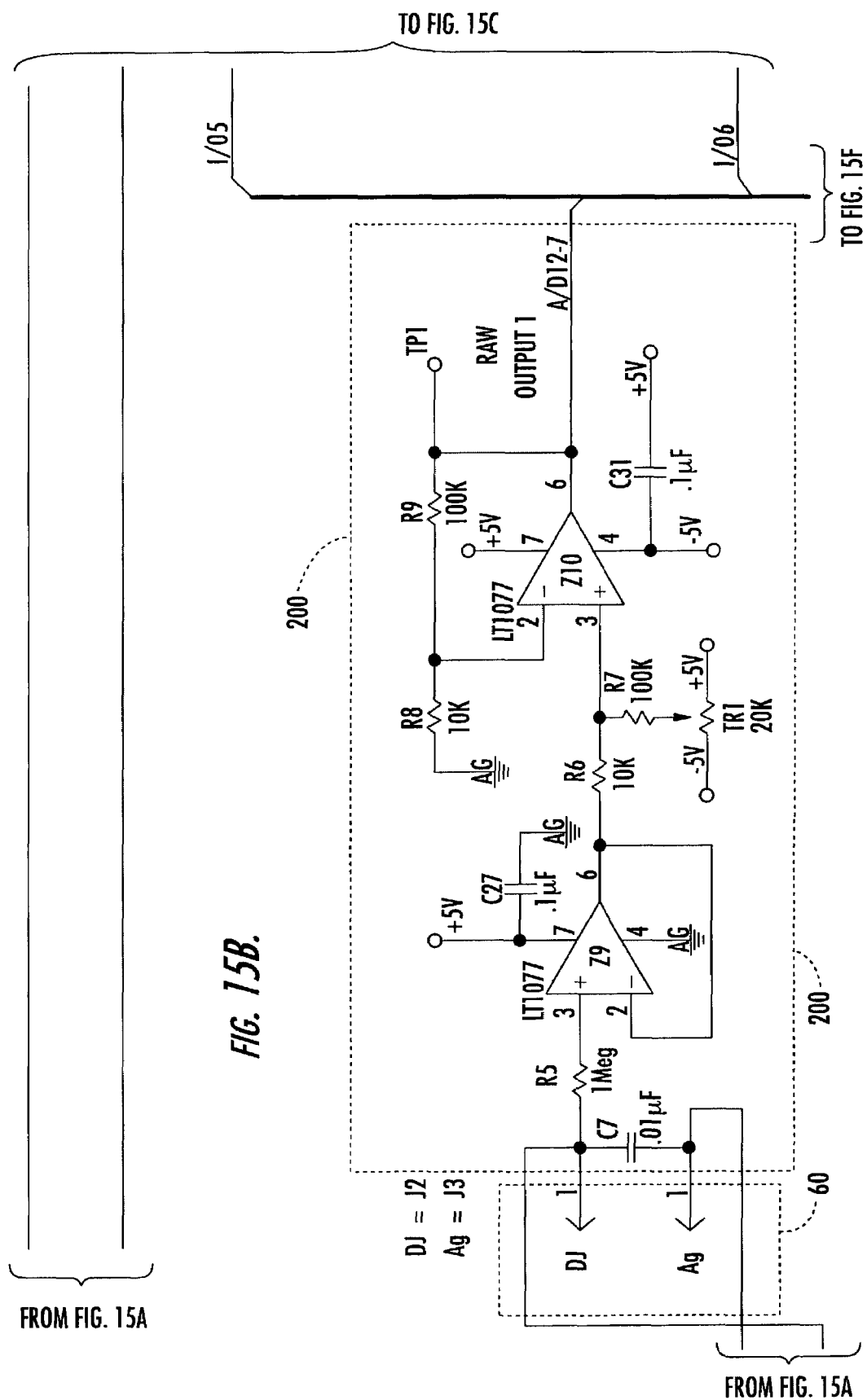
FIGS. 15A–15T are interrelated portions of a schematic diagram of the circuitry on a main printed circuit board housed in the unit box illustrated in FIG. 2.
Figure 15D:
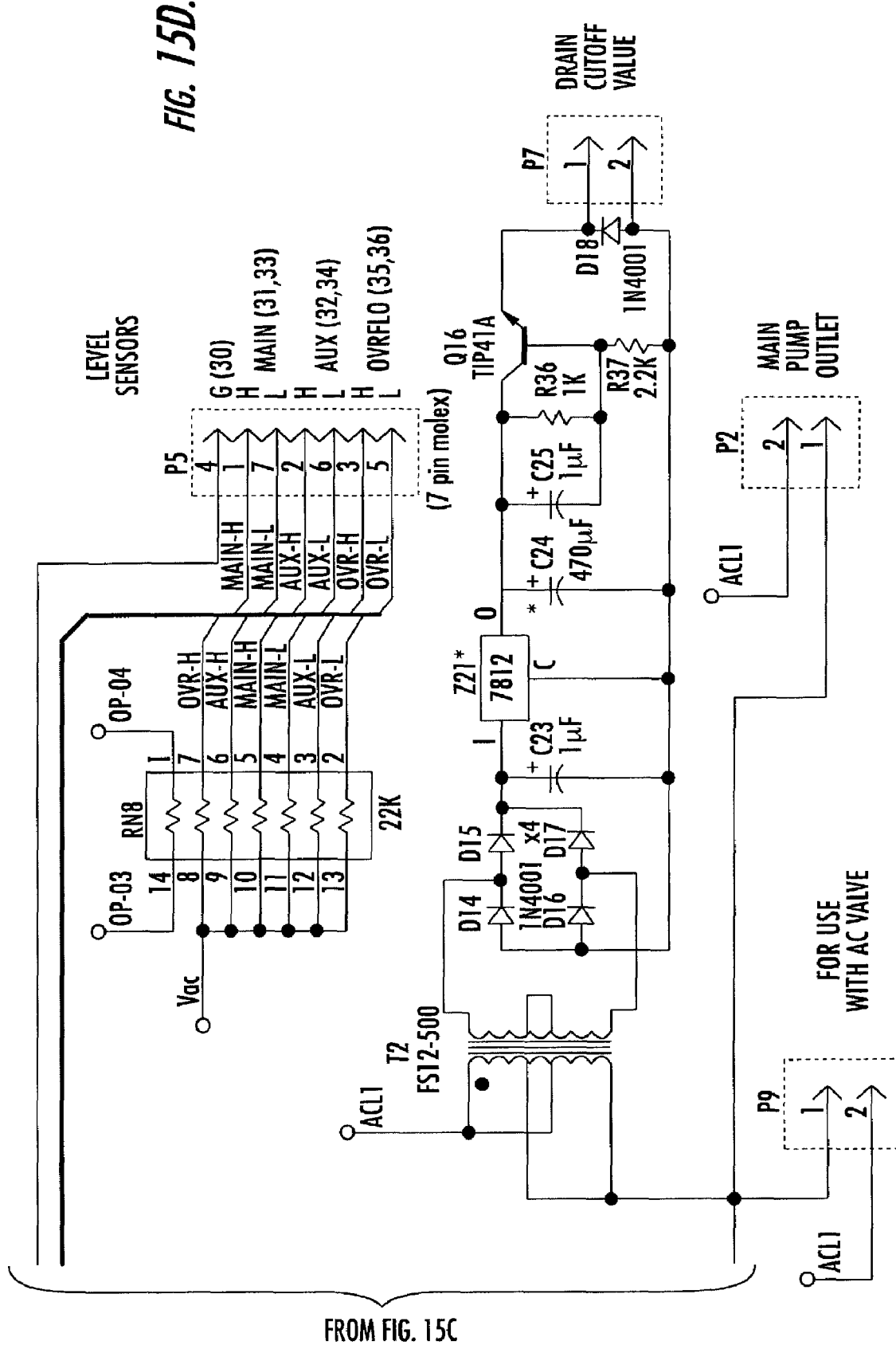
Figure 15F:
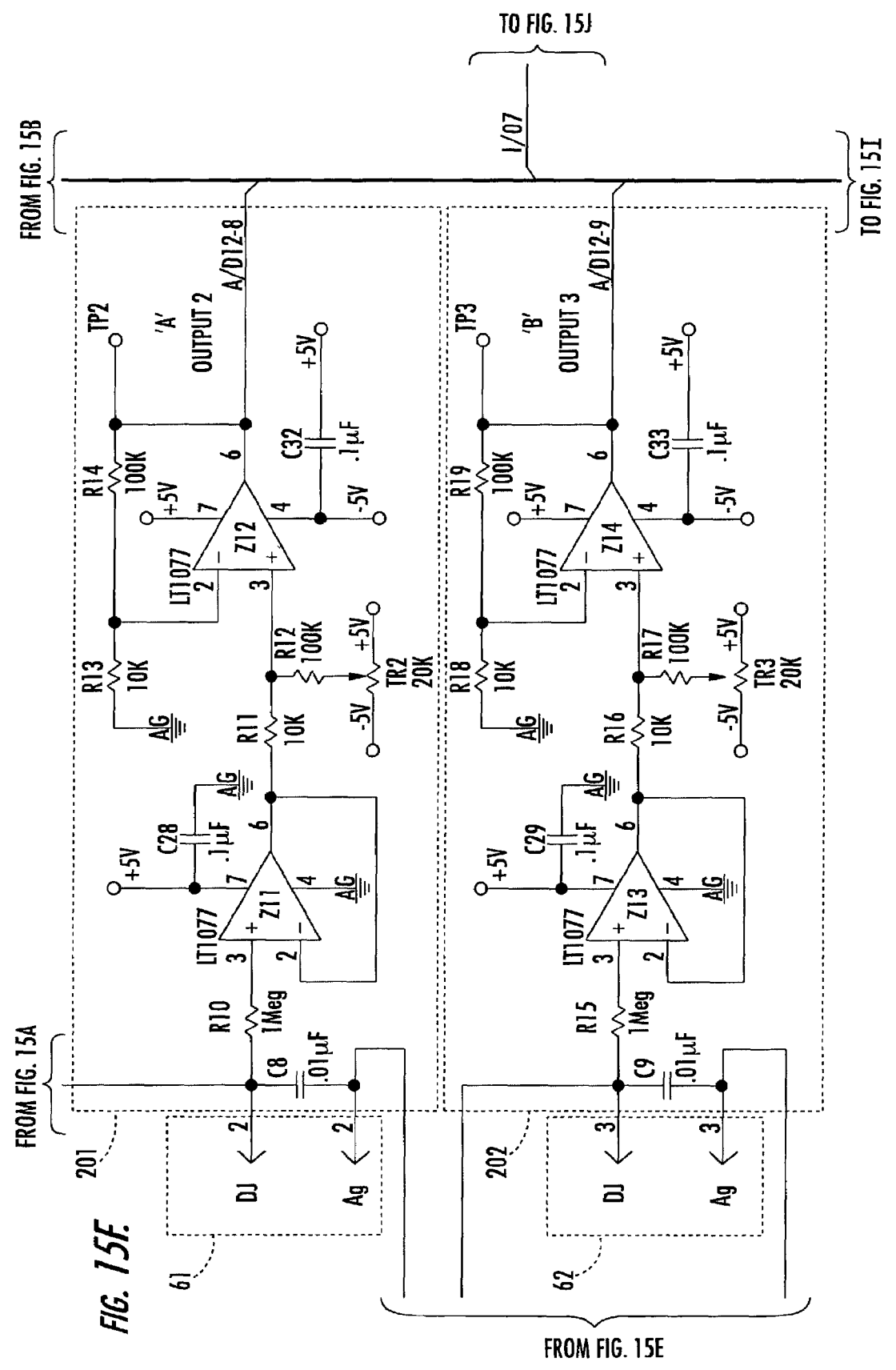
Figure 15G:
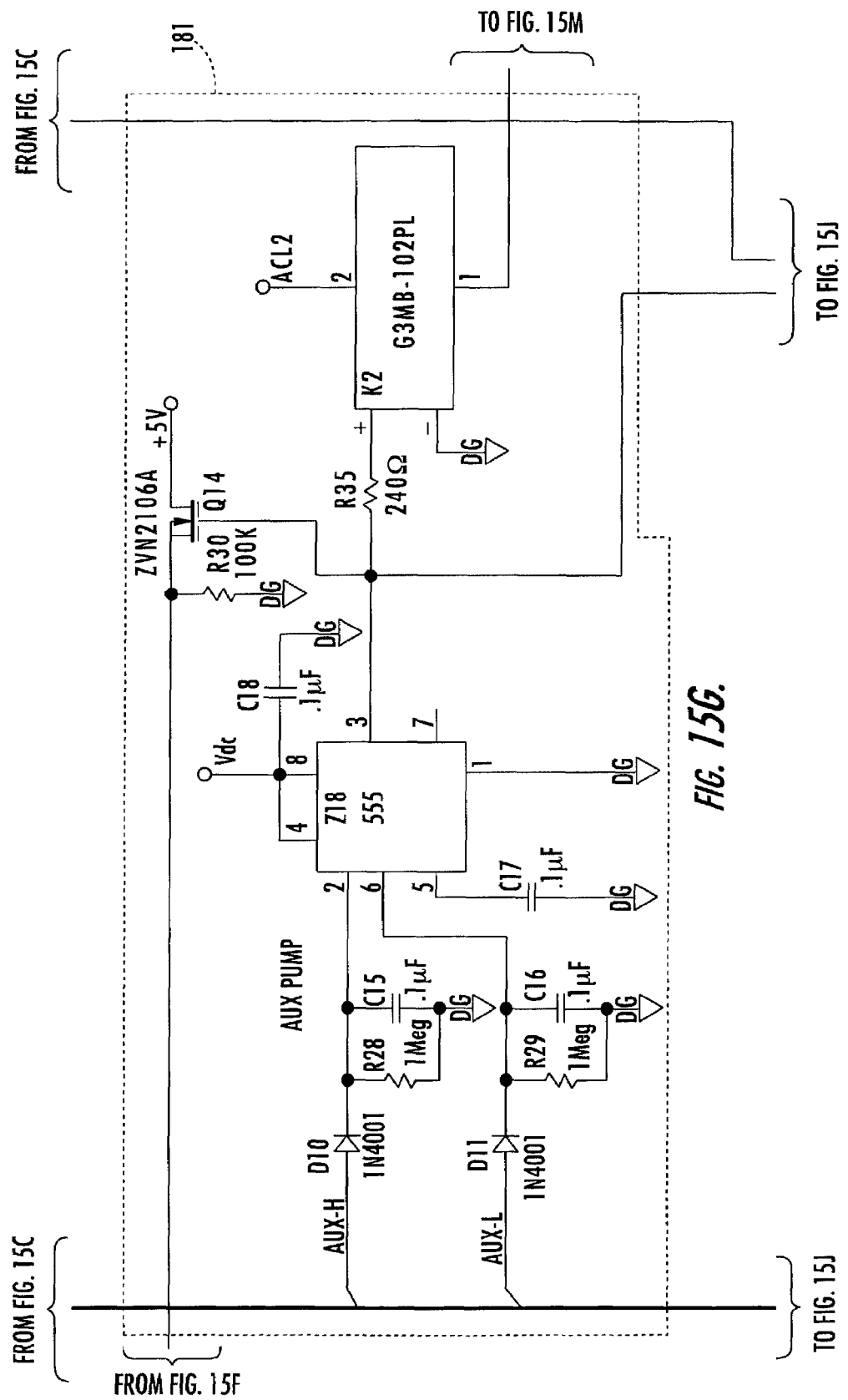
Figure 15H:
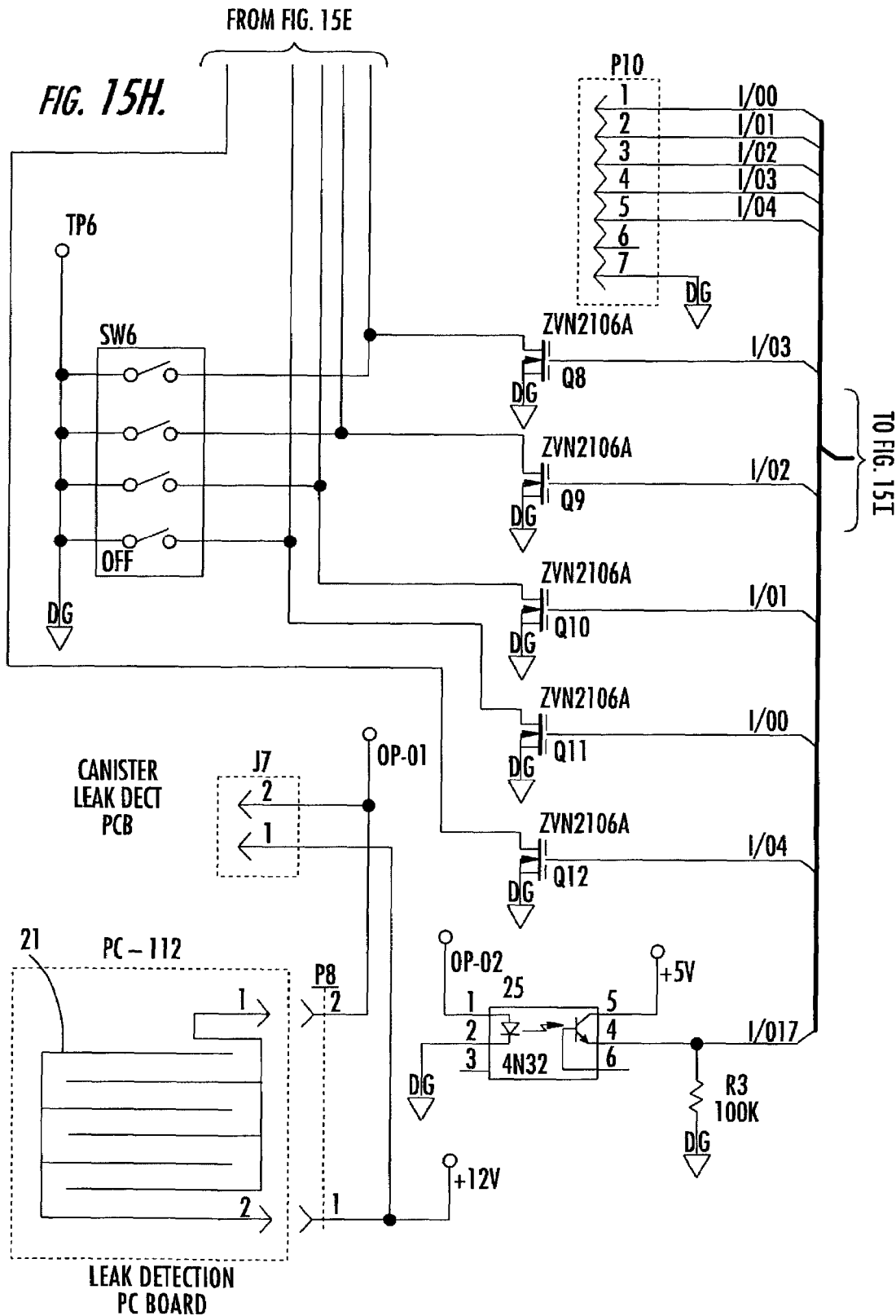
Figure 15I:
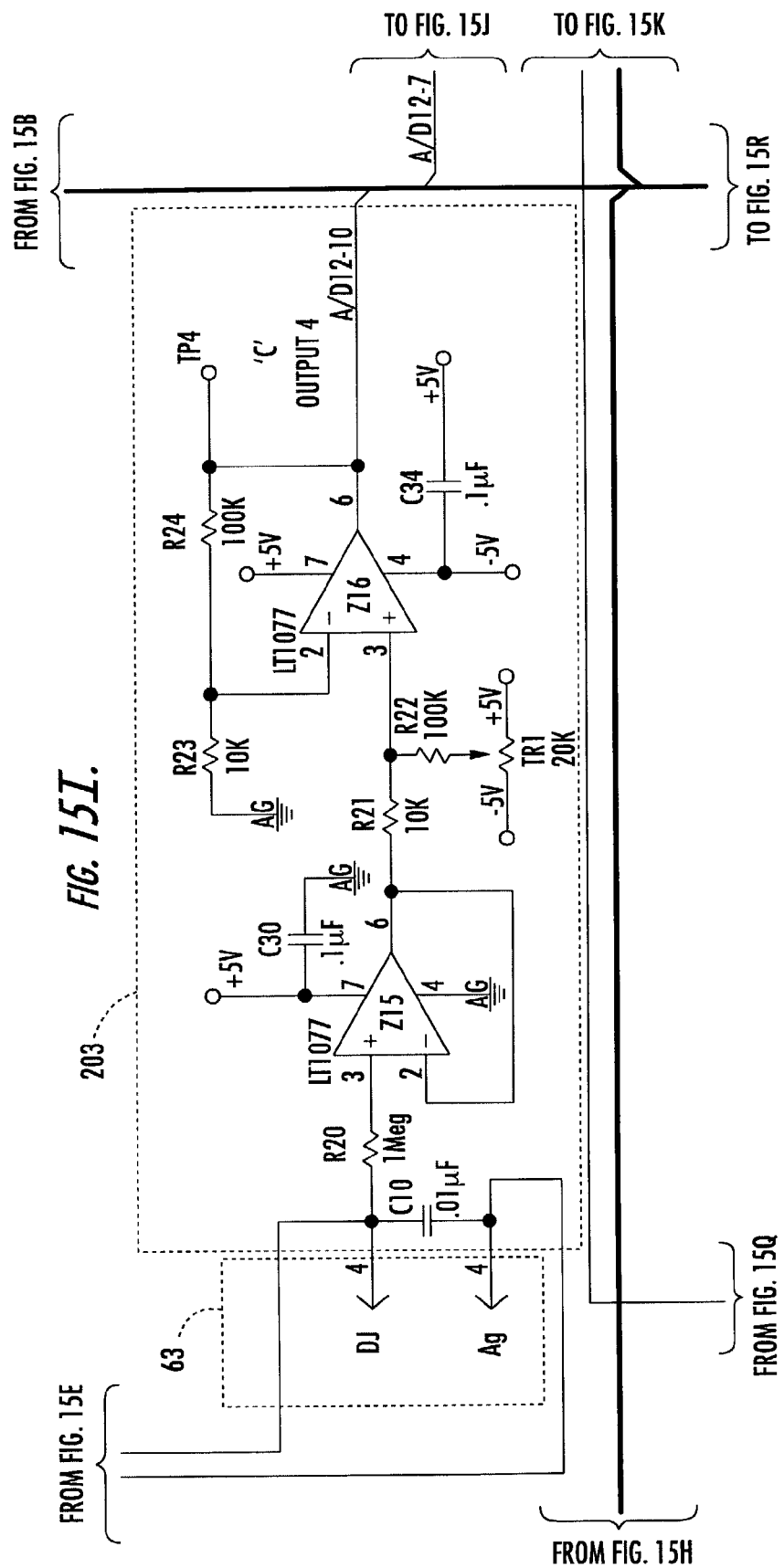
Figure 15J:
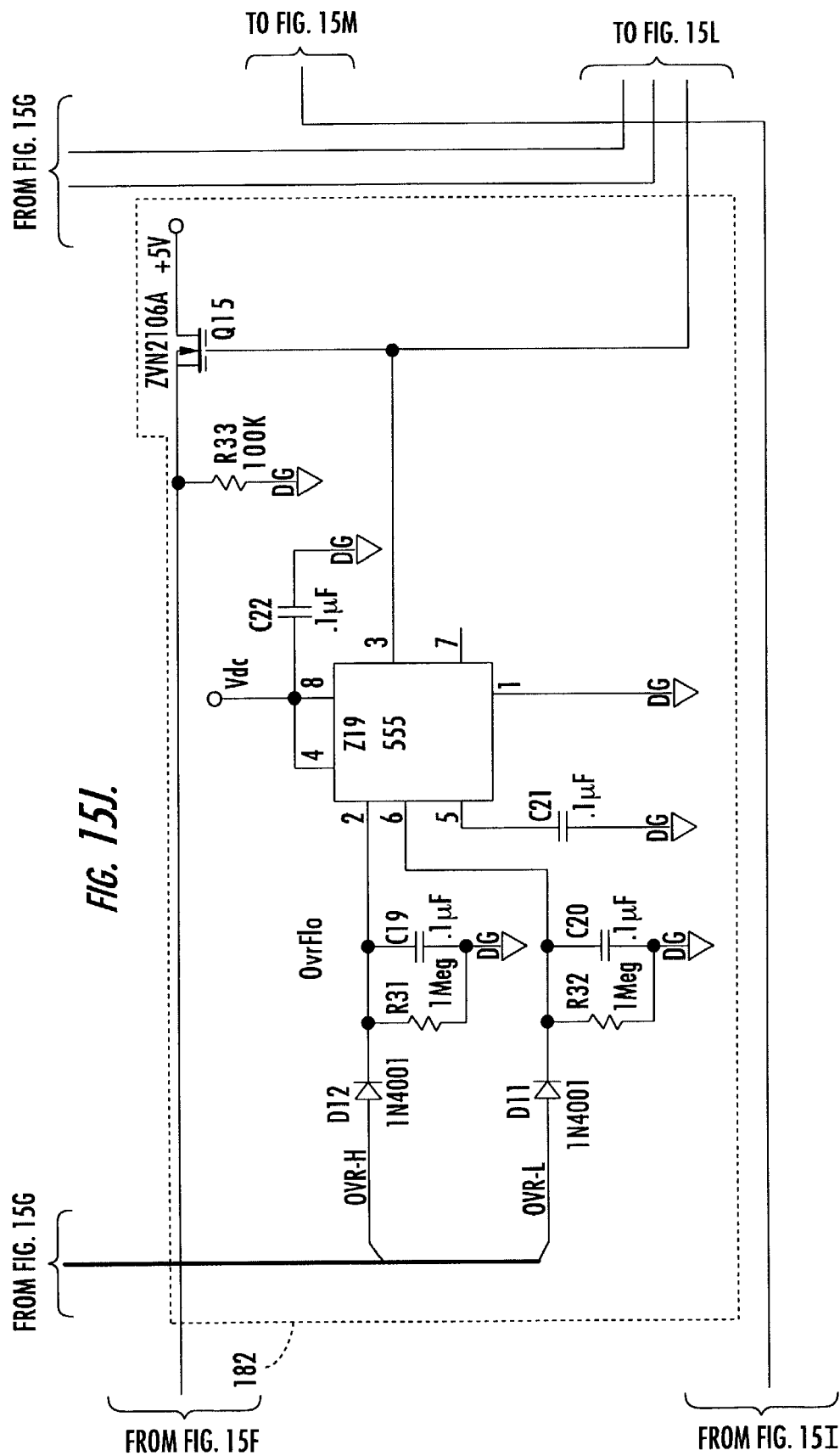
Figure 15K:
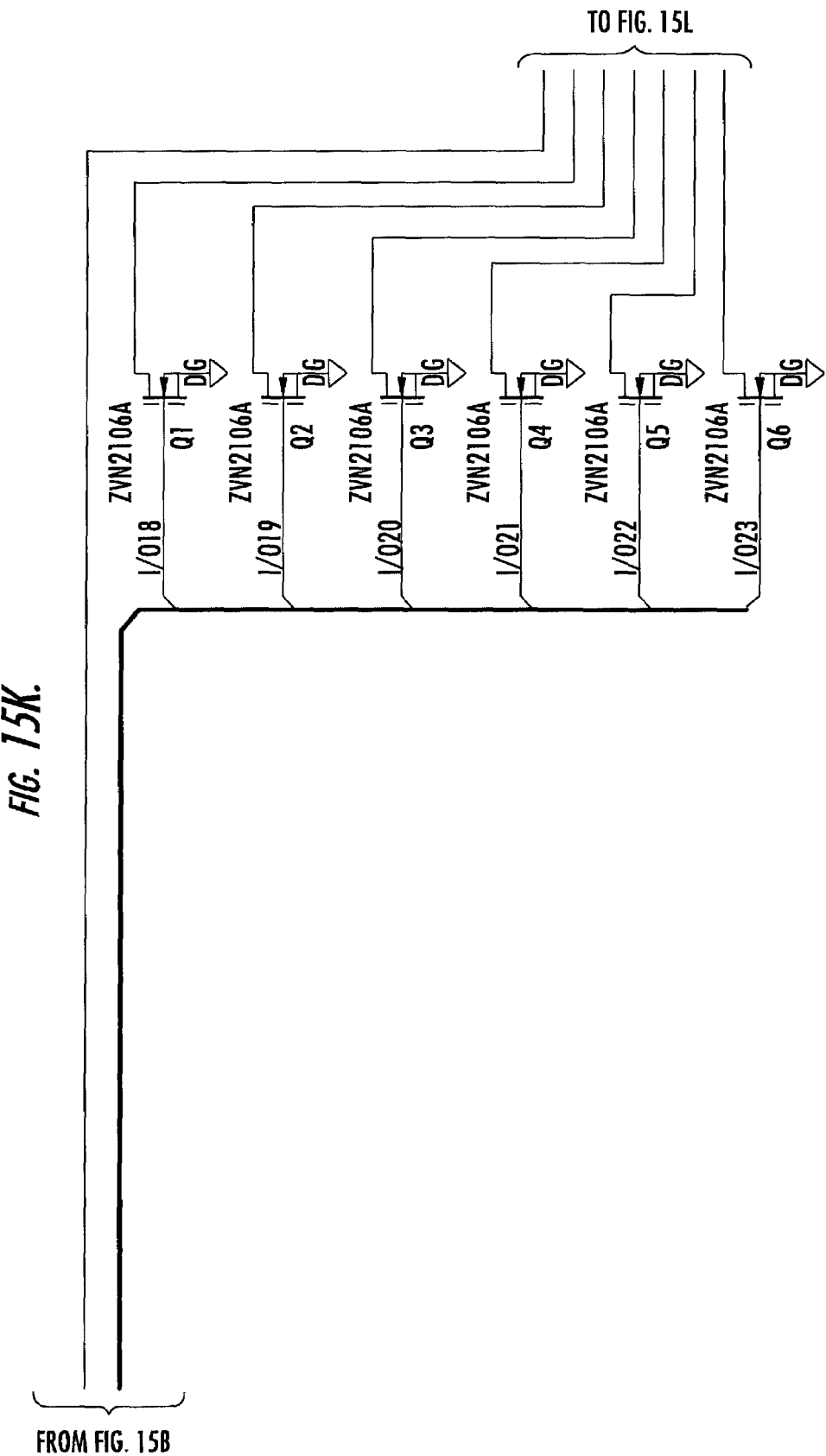
Figure 15M:
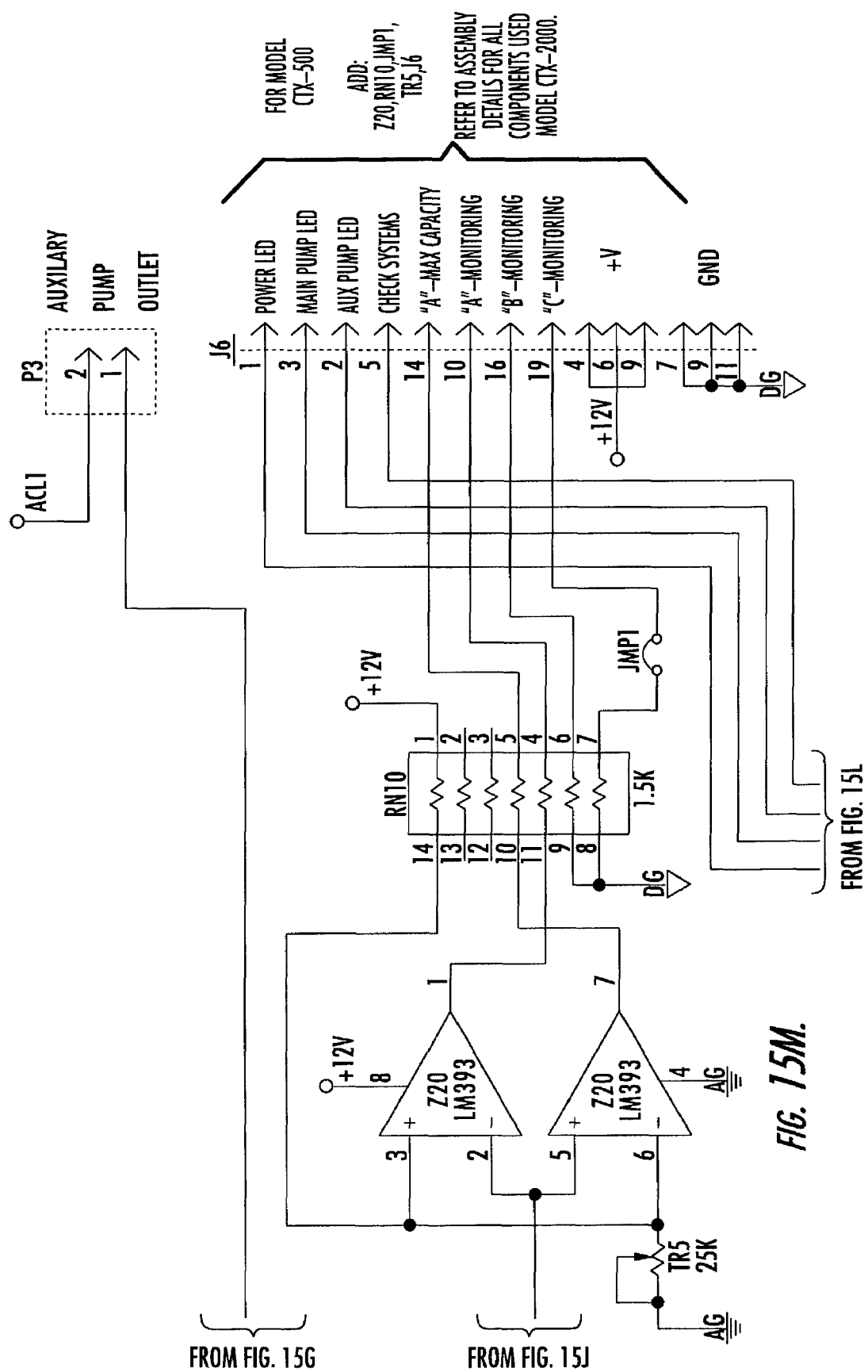
Figure 15N:
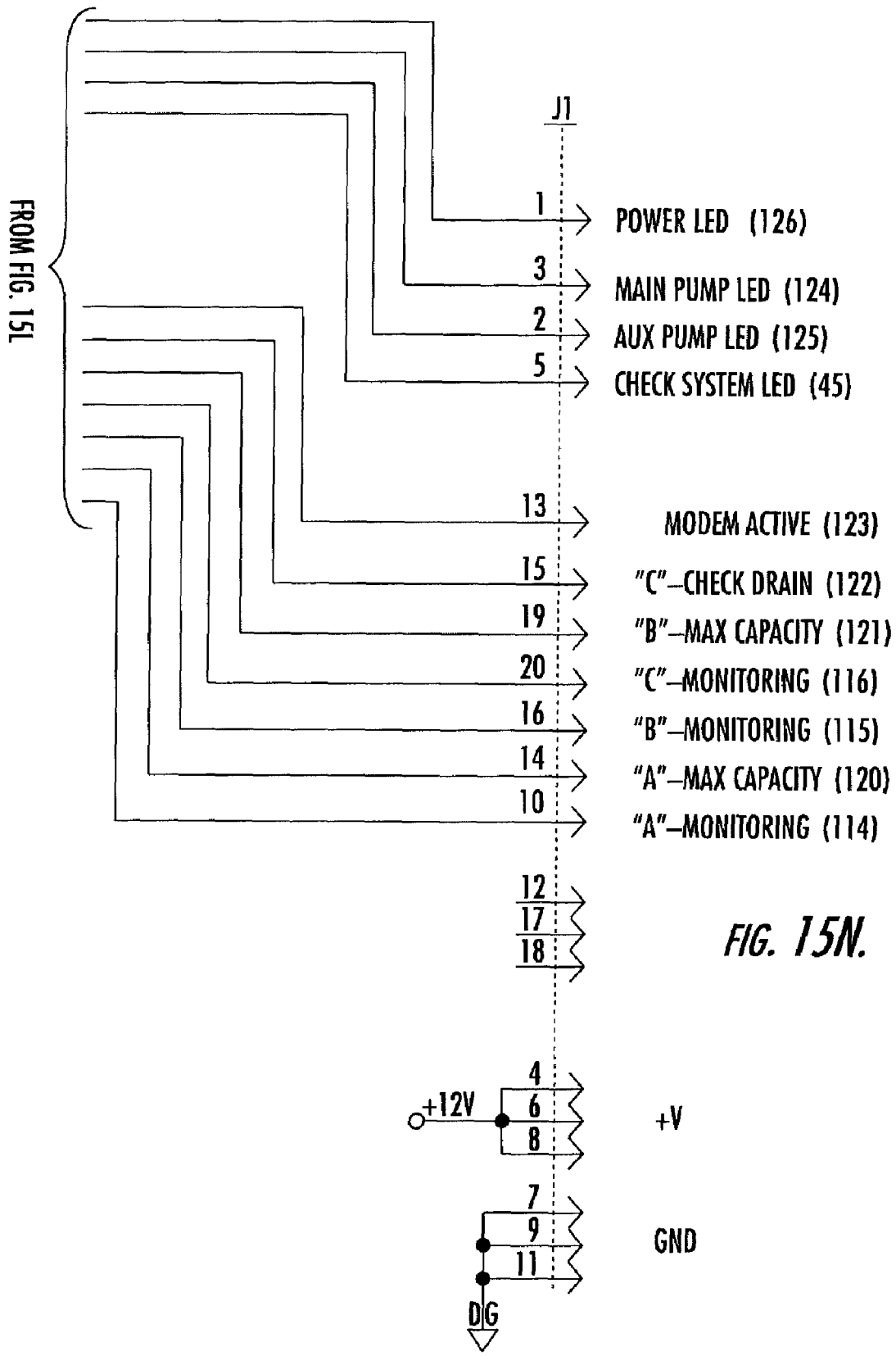
Figure 15O:
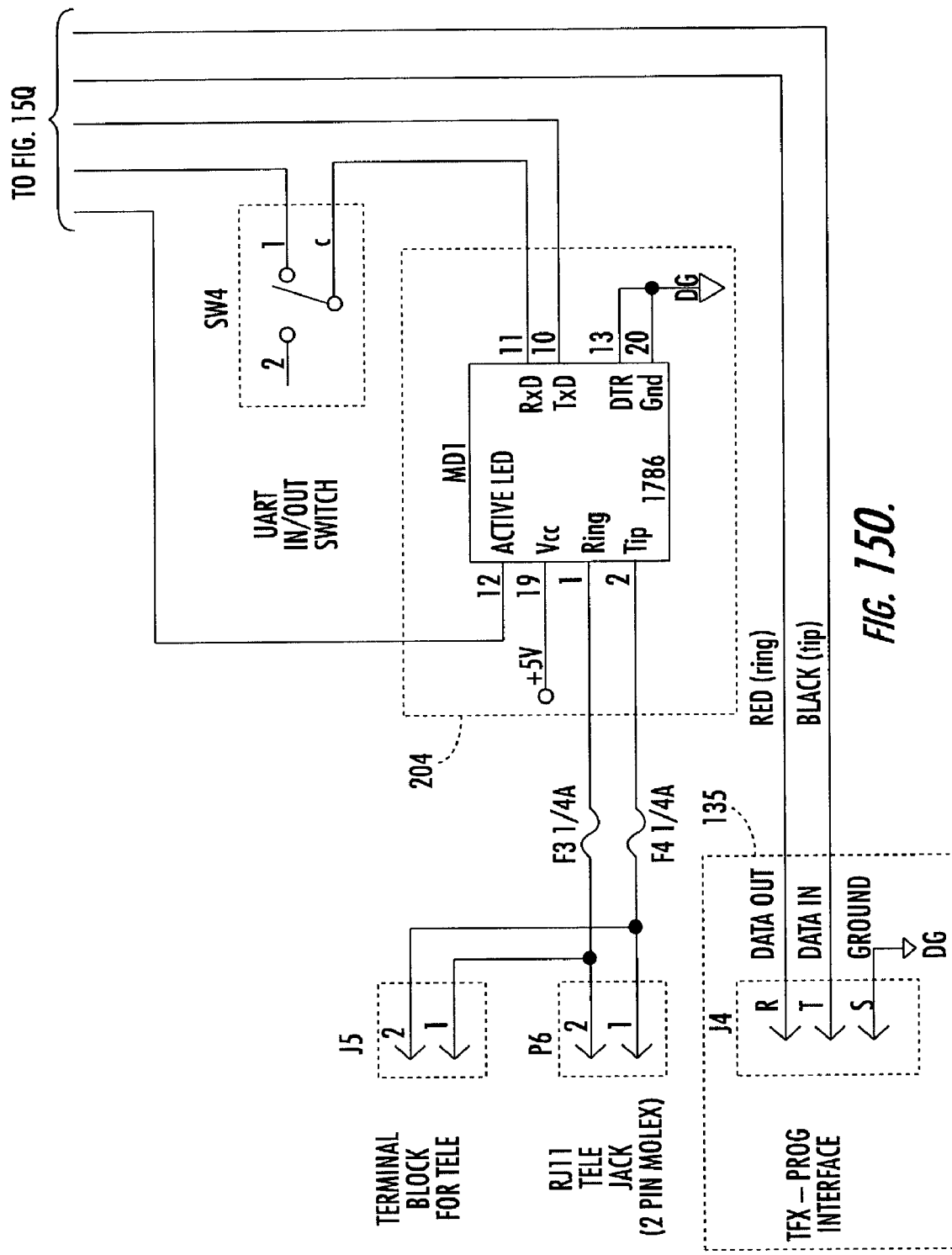
Figure 15P:
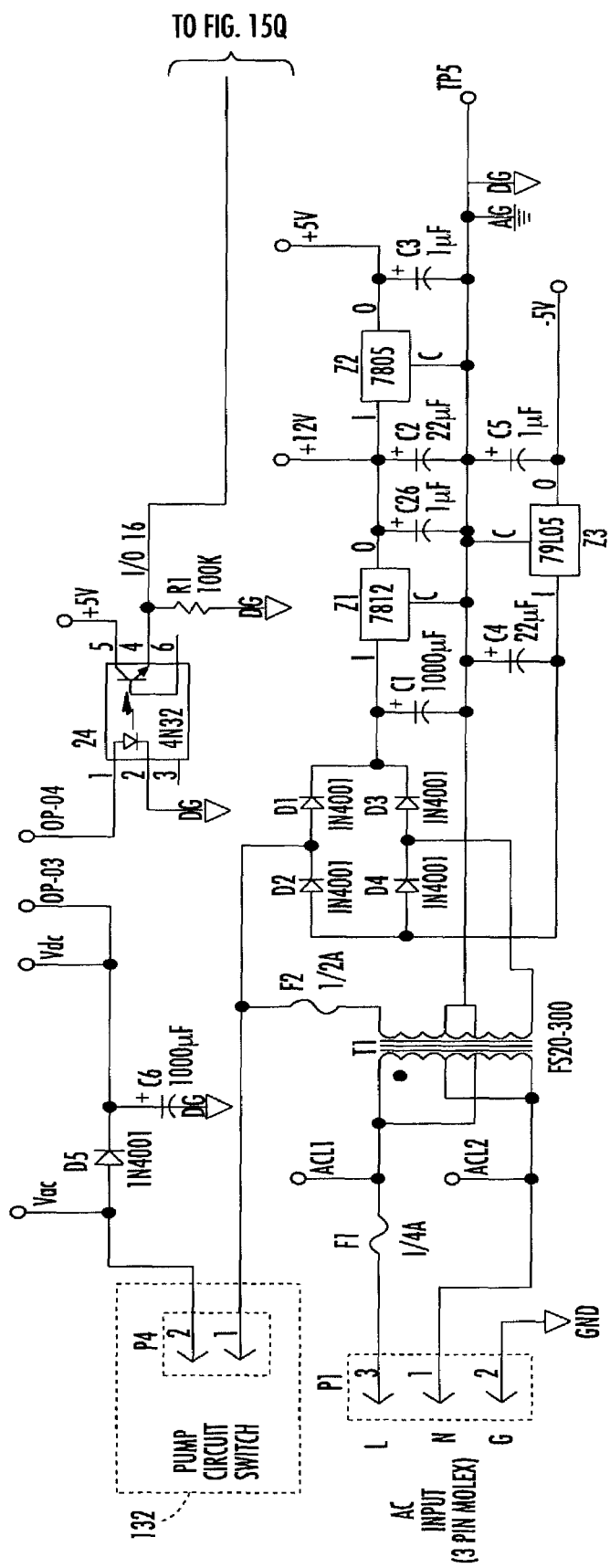
Figure 15Q:
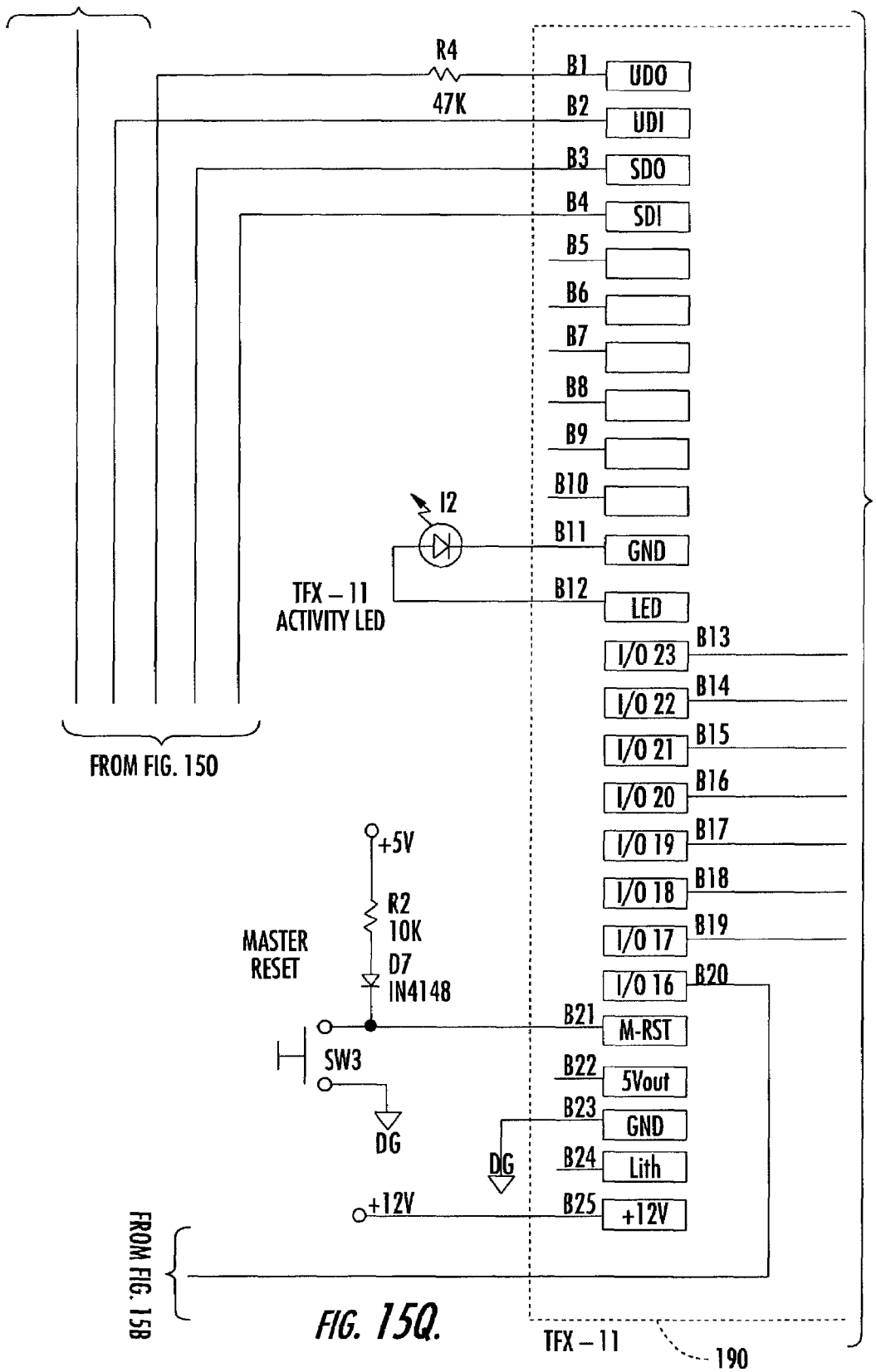
Figure 15R:
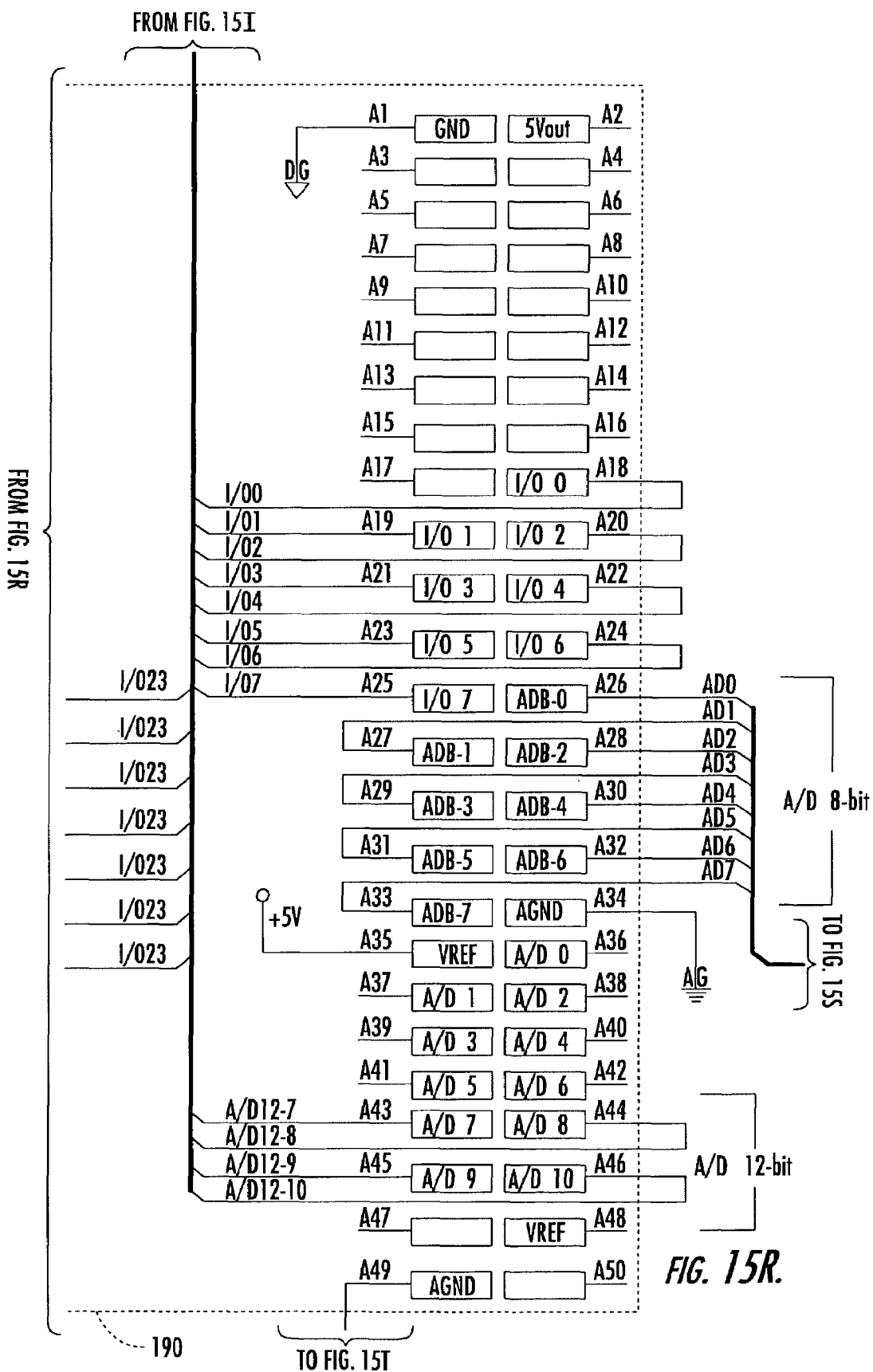
Figure 15S:
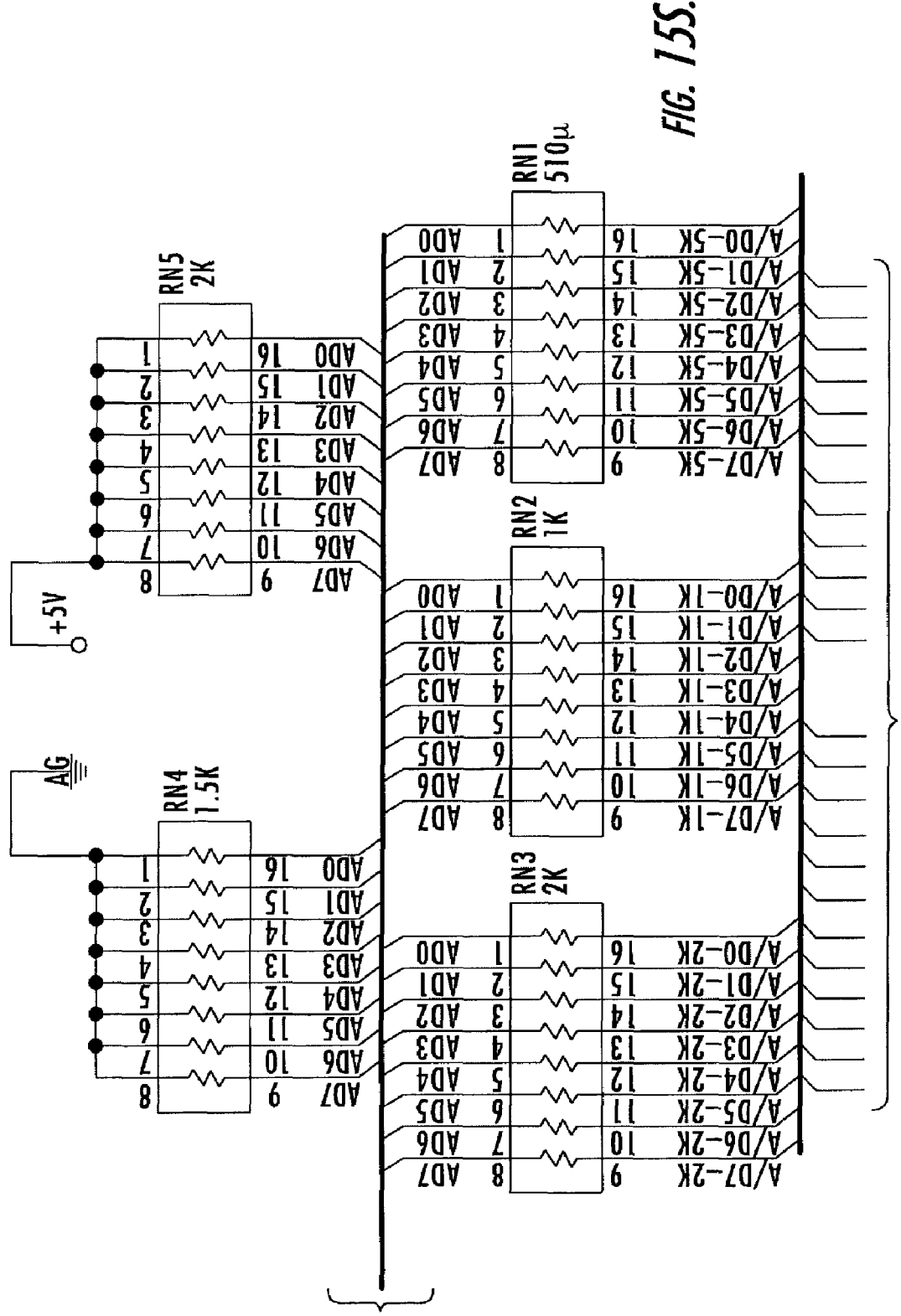
Figure 15T:
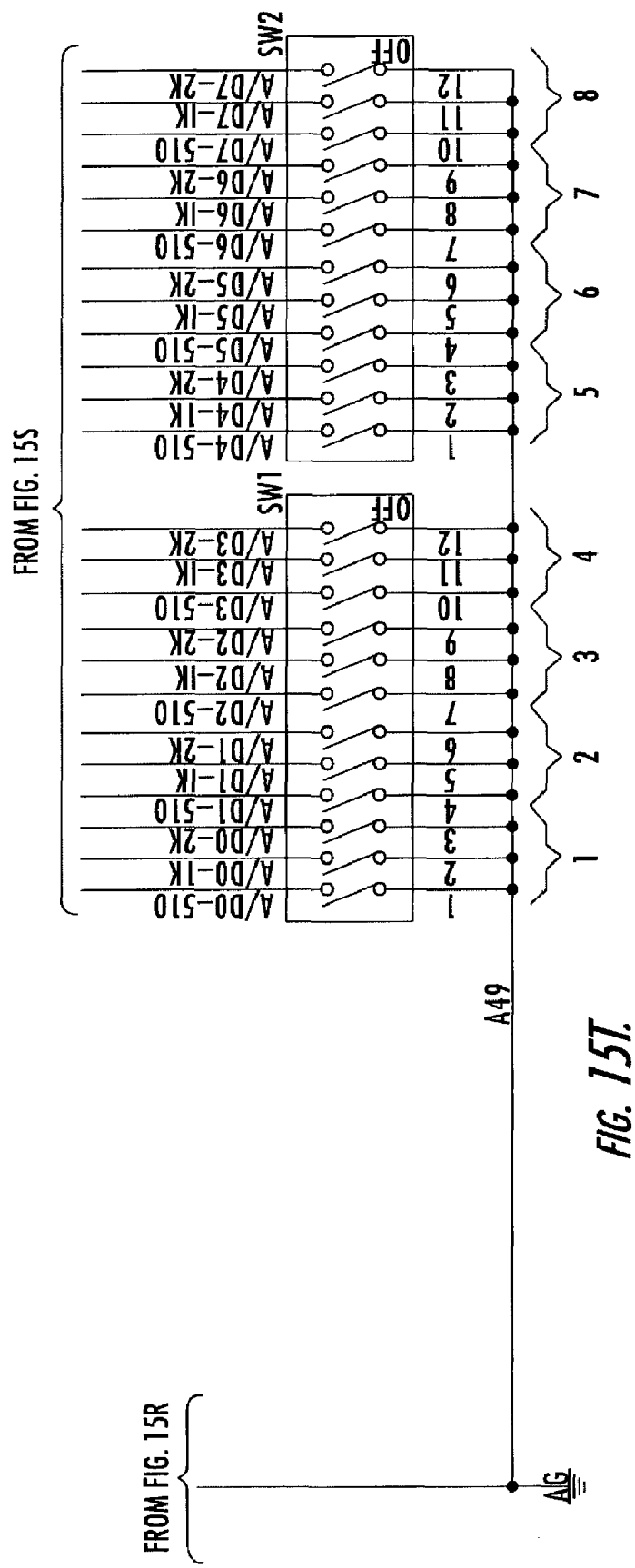

FIG. 15 is a block diagram illustrating the flow of electrical signals through the system 10 (FIG. 1), including a general depiction of the various components on the main PCB 20 (FIG. 1) and the electrical components of the system not included on the main PCB 20. Detailed schematic diagrams of the main PCB 20 are included as FIGS. 15A–15T. The reference numerals used to describe the elements of the main PCB 20 shown in the block diagram in FIG. 15 are also shown on the schematic diagrams in FIGS. 15A–15T. However, on the schematic diagrams in FIGS. 15A–15T, the reference numerals usually refer to collections of components enclosed by dotted lines rather than to individual components.

Referring now to FIGS. 15, 15C, 15G, 15J, and 15N, when the main PCB 20 receives signals from the fluid level sensor 17 that one of the activation rods (main pump, auxiliary pump, overflow indicator) of the fluid level sensor 17 has been contacted by the fluid in the receptacle 11, a latch circuit activates the respective element (main pump, auxiliary pump, overflow indicator) and illuminates the respective LED on the front panel of the unit box. The latch circuits on the main PCB comprise a main pump latch circuit 180 (FIG. 15C), an auxiliary pump latch circuit 181 (FIG. 15G), and an overflow indicator latch circuit 182 (FIG. 15J), and the respective LEDs (FIG. 15N) comprise a main pump LED 124, an auxiliary pump LED 125, and a "check system" LED 45 (overflow indicator). When the fluid in the receptacle 11 falls below a shutoff rod (main pump, auxiliary pump, overflow indicator) of the fluid level sensor 17 after having contacted the respective activation rod of the shutoff rod, the respective latch circuit 180, 181, 182 on the main PCB deactivates the element and LED associated with the shutoff rod. Therefore, the latch circuits 180, 181, 182 activate their respective elements and LEDs (main pump, auxiliary pump, overflow indicator) when the respective activation rods are contacted by fluid in the receptacle and the latch circuits 180, 181, 182 do not deactivate those elements and LEDs until the fluid falls below the respective shutoff rod.

The silver sensors 60, 61, 62, 63 take readings of the silver concentration of the fluid passing through the system when a microprocessor 190 on the main PCB 20 instructs the silver sensors 60–63 to do so in accordance with the programming of the microprocessor 190. The microprocessor 190 used in an embodiment of the invention is a Model TFX-11 manufactured by Onset Computer Corporation, P.O. Box 3450, Pocasset, MA 02559-3450 (www.onsetcomp.com). The source code of an embodiment of the software for programming the microprocessor 190 is provided in a computer program listing appendix filed with this application on recordable compact disc (CD-R). A flow chart illustrating a silver monitoring method according to an embodiment of the invention, as implemented by an embodiment of the software of the invention, is shown in FIGS. 17–17H and discussed below.

The silver sensors 60–63 are each controlled by the microprocessor 190 via an optical switch 191, 192, 193, 194 (FIGS. 15A, 15E). When they are activated by the optical switches 191–194, each of the silver sensors 60–63 transmit a silver concentration signal, the voltage of which varies inversely with the silver concentration of the fluid. These silver concentration signals are transmitted by the silver sensors 60–63 to the main PCB 20 and are amplified by respective amplifier circuits 200, 201, 202, 203 (FIGS. 15B, 15F, 15I) on the main PCB 20 before being transmitted to the microprocessor 190. The microprocessor 190 has been programmed with a set of predetermined acceptable silver concentration signal voltages. Using the method such as the embodiment illustrated in FIGS. 17–17H, the microprocessor 190 analyzes the silver concentration signal voltages from the silver sensors 60–63 to determine if the silver concentration in the fluid is above the predetermined acceptable levels.

If a silver concentration signal voltage received from a silver sensor 60–63 is determined by the microprocessor 190 to be below a predetermined acceptable level, the microprocessor 190 transmits a silver alert signal in the form of an error code to activate the modem 204, which utilizes a telecommunications network (not shown) to transmit a notification signal (the error code received from the microprocessor 190) to the remote monitoring station 210 (FIG. 15) to alert the remote monitoring station 210 that the silver concentration in the fluid is too high. As discussed further below, depending on which silver sensor 60–63 has transmitted the silver concentration signal with the unacceptably low voltage (indicating an unacceptably high silver concentration), these error codes indicate that one of the filter canisters 12A, 12B, 12C (FIG. 1) has either failed or reached maximum capacity and therefore needs to be serviced by a technician. As shown in FIGS. 17–17H, the microprocessor 190 transmits a different error code depending on which silver sensor 60–63 transmitted the unacceptably low silver concentration signal voltage to the microprocessor 190. Error code 1 is transmitted by the microprocessor 190 when the second silver sensor 61 has transmitted a silver concentration signal determined by the microprocessor 190 to indicate the failure or maximum capacity state of the filter canister 12A. Error code 2 is transmitted by the microprocessor 190 upon determination that the third silver sensor 62 has transmitted a silver concentration signal determined by the microprocessor 190 to indicate the failure or maximum capacity state of the filter canister 12B. Error code 3 is transmitted by the microprocessor 190 upon determination that the fourth silver sensor 62 has transmitted a silver concentration signal determined by the microprocessor 190 to indicate the failure or maximum capacity state of the filter canister 12C.

Figure 17:
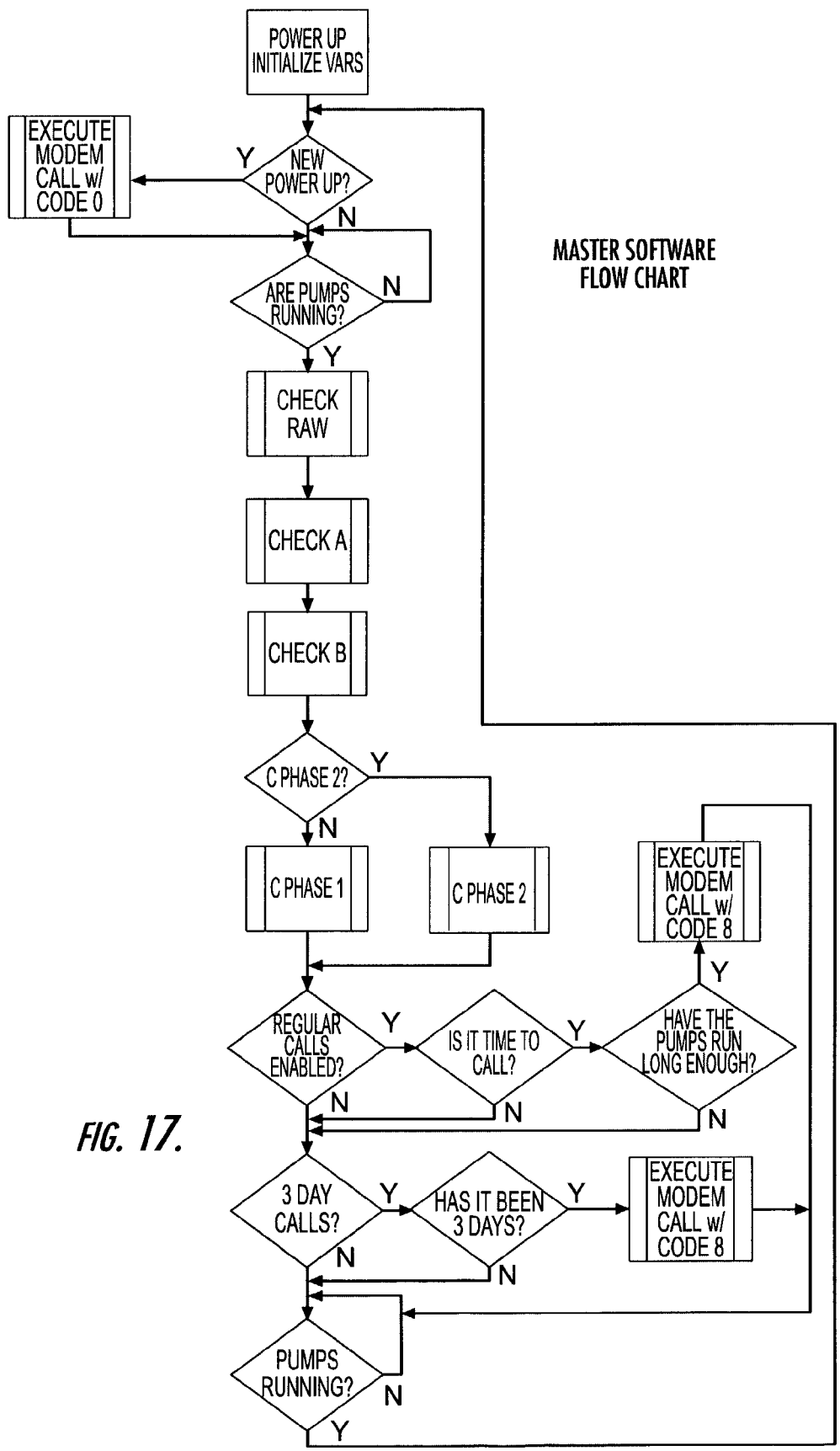
FIGS. 17, 17A, 17B, 17C, 17D, 17E, 17F, 17G, and 17H are flow charts generally illustrating an embodiment of a silver monitoring method executed by software programmed into a microprocessor utilized in an embodiment of the invention.
Figure 17A:
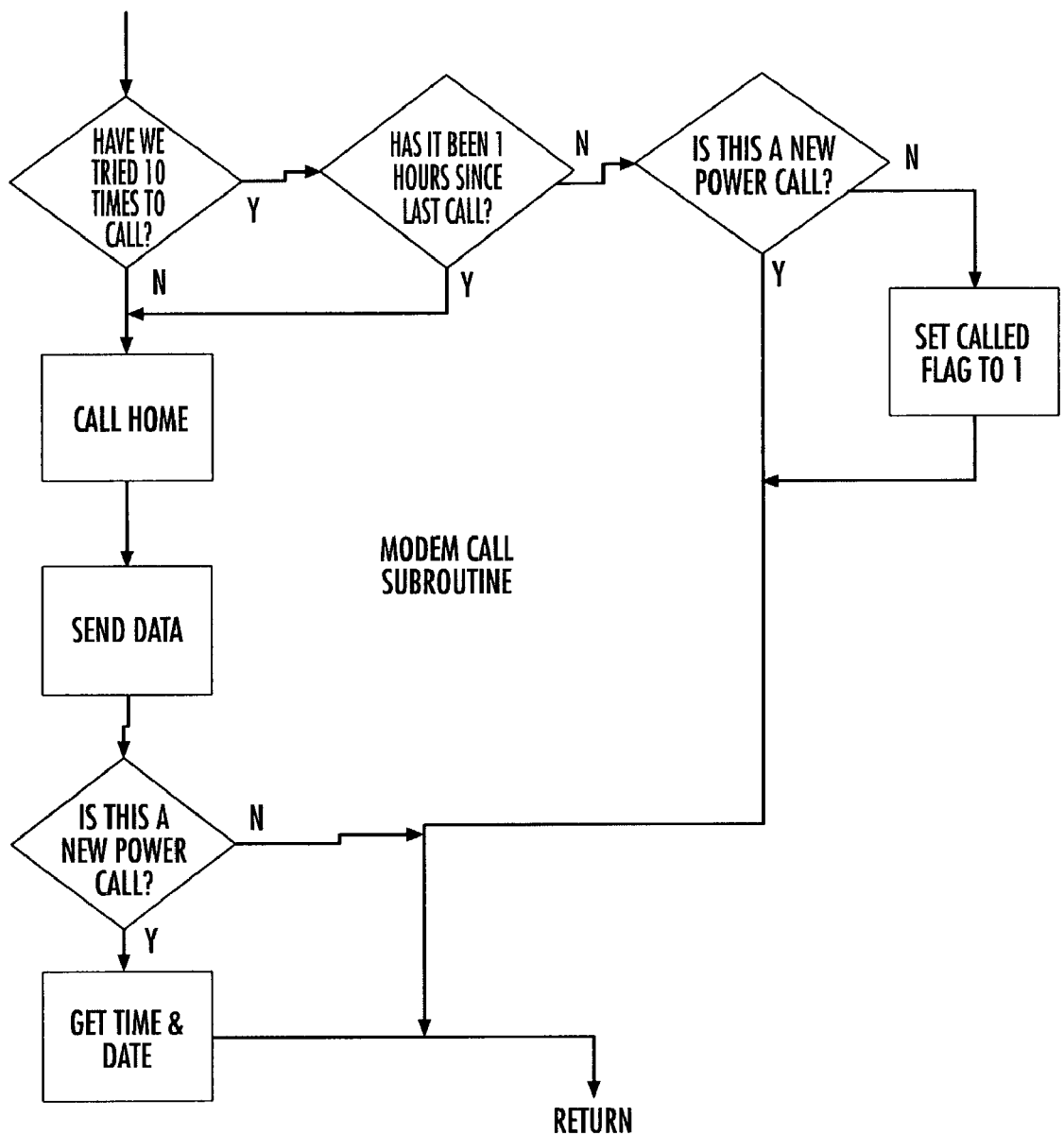
Figure 17B:
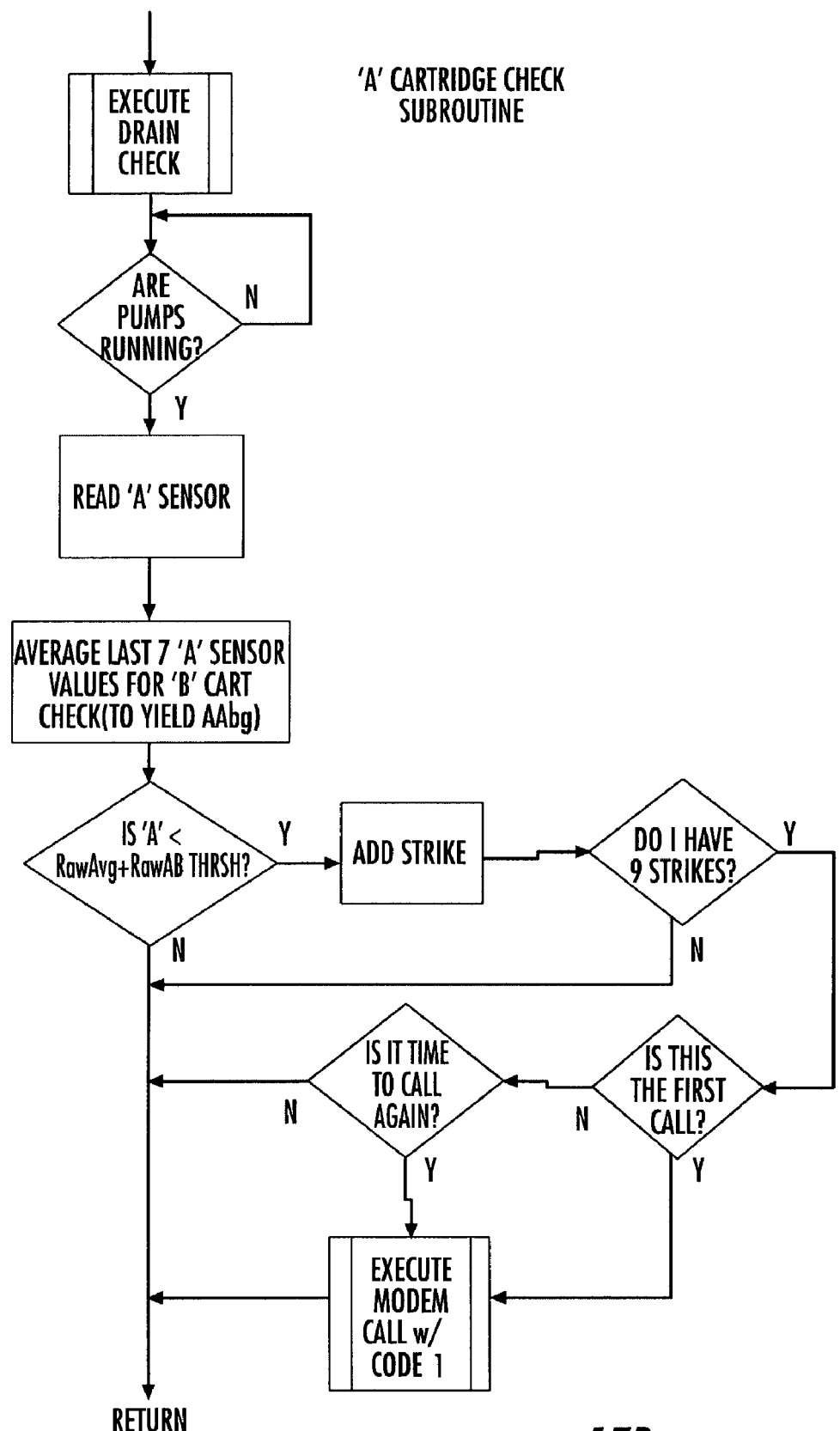
Figure 17C:
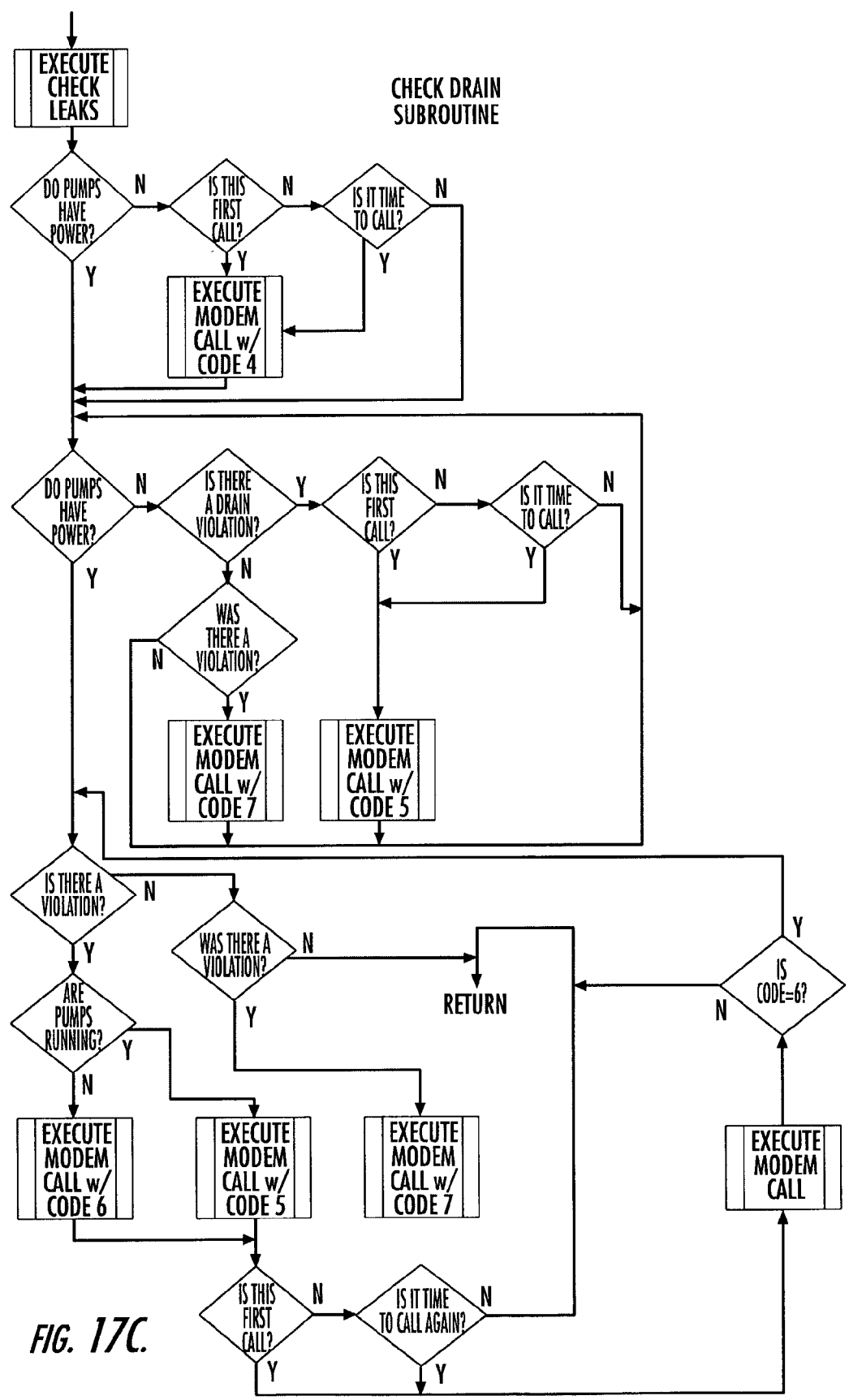
Figure 17D:
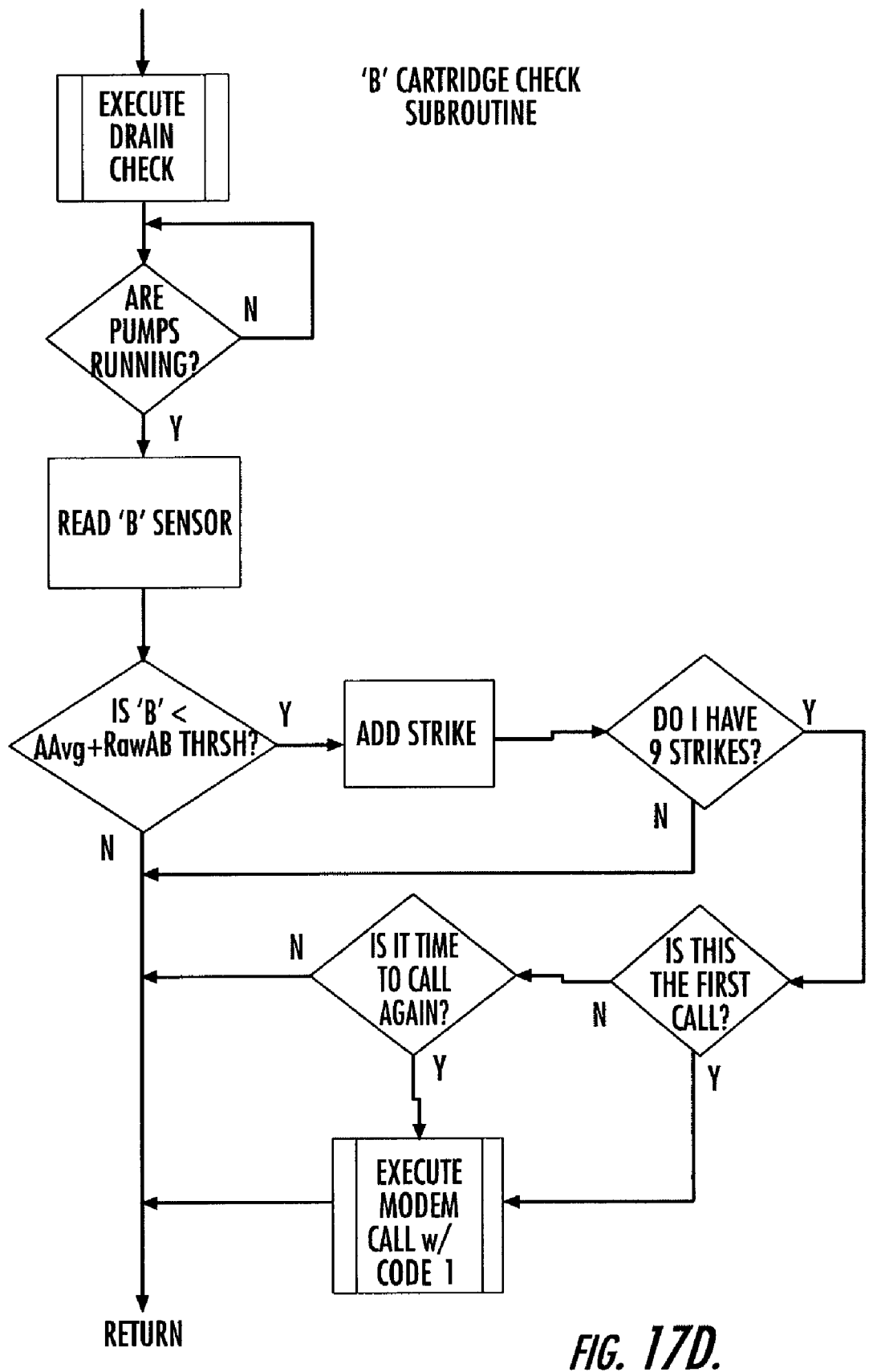
Figure 17E:
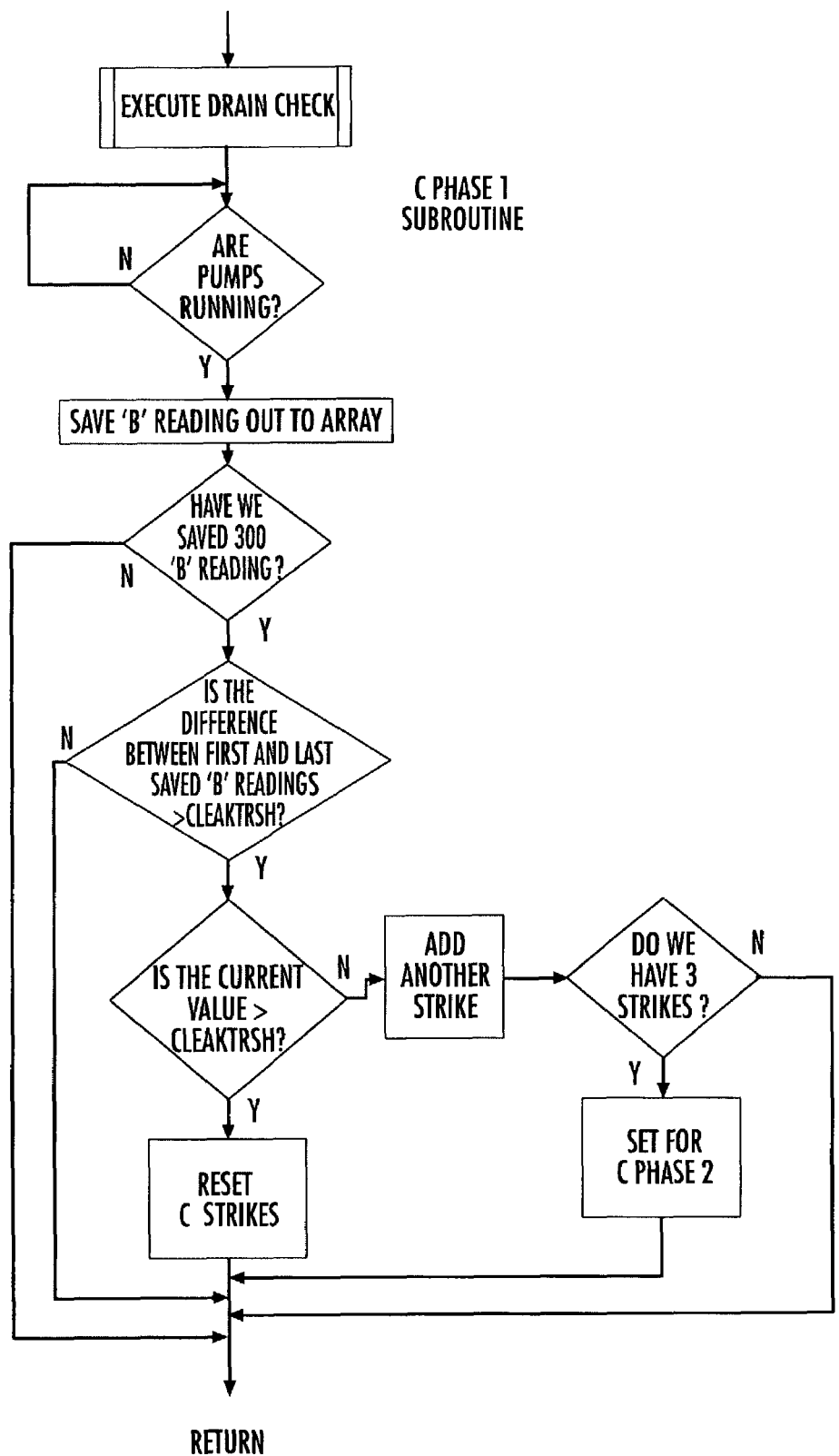
Figure 17F:
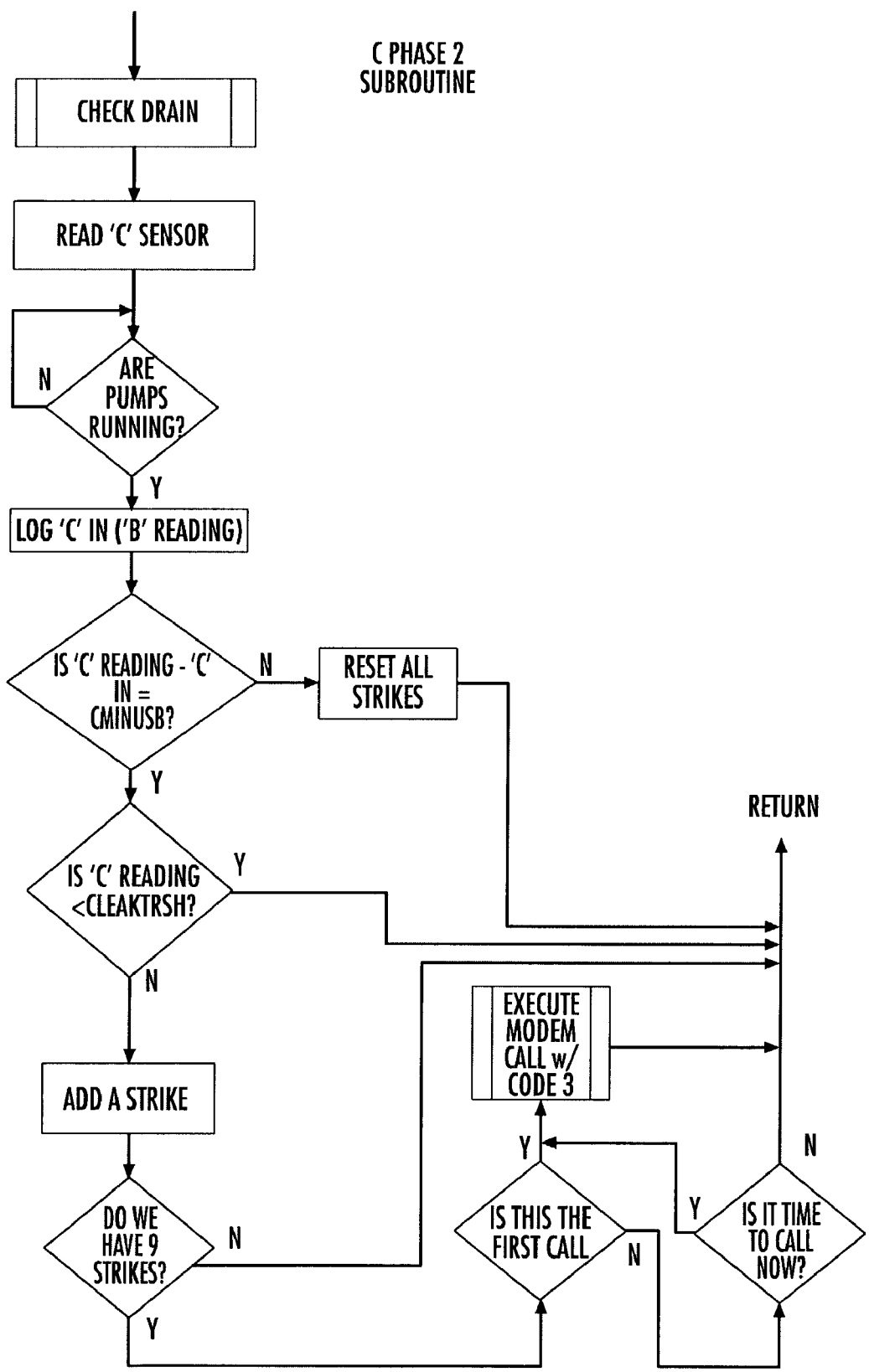
Figure 17G:
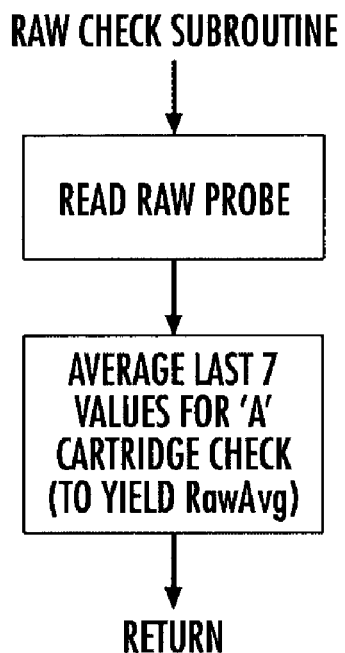
Figure 17H:
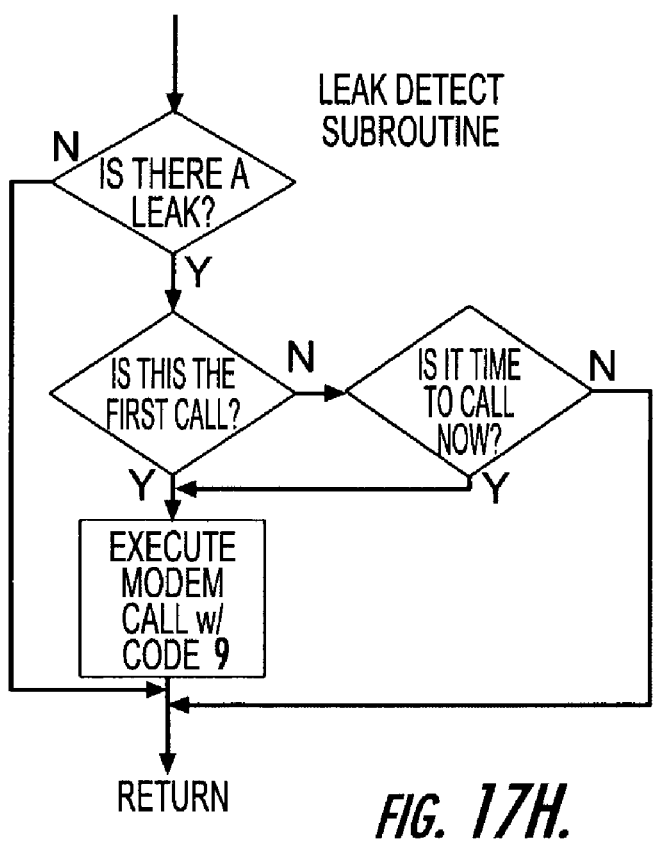

In addition, as shown in FIGS. 17–17H, the microprocessor 190 may send error codes via the modem 204 to the remote monitoring station 210 (FIG. 15) that are not triggered by silver concentration signals from the silver sensors 60–63, but by other conditions or events occurring in the system, such as the powering on of the system (error code 0), the switching of the pump power switch 132 to the "off" position (error code 4), the activation of the overflow indicator 45 with the pumps 14, 15 operating (error code 5), the activation of the overflow indicator 45 without the pumps 14, 15 operating (error code 6), the deactivation of the overflow indicator 45 (error code 7), the passage of a predetermined time after the powering on of the system (error code 8), and the detection of a fluid leak within the unit box by the leak detector PCB 21 (error code 9). As can be seen from the descriptions of these various error-code-triggering conditions and events, although the term "error codes" is used to denote the signals sent to the remote monitoring station 210 by the microprocessor 190 via the modem 204, the conditions and events being monitored do not always constitute failures or errors in the system. All the above error codes are translated at the remote monitoring station 210 to communicate the occurrence of the respective conditions or events.

In the illustrated embodiment, the microprocessor 190 also transmits the silver alert signal to one or more of the LEDs on the front panel 113 of the unit box 13, and the one or more LEDs then provide a visual notification signal to a user utilizing the system as an onsite silver monitoring station. Alternatively, the microprocessor 190 may transmit the silver alert signal to either the modem 204 or the one or more front panel LEDs, thereby triggering only one notification signal at either the remote or onsite silver monitoring station.

Figure 16:
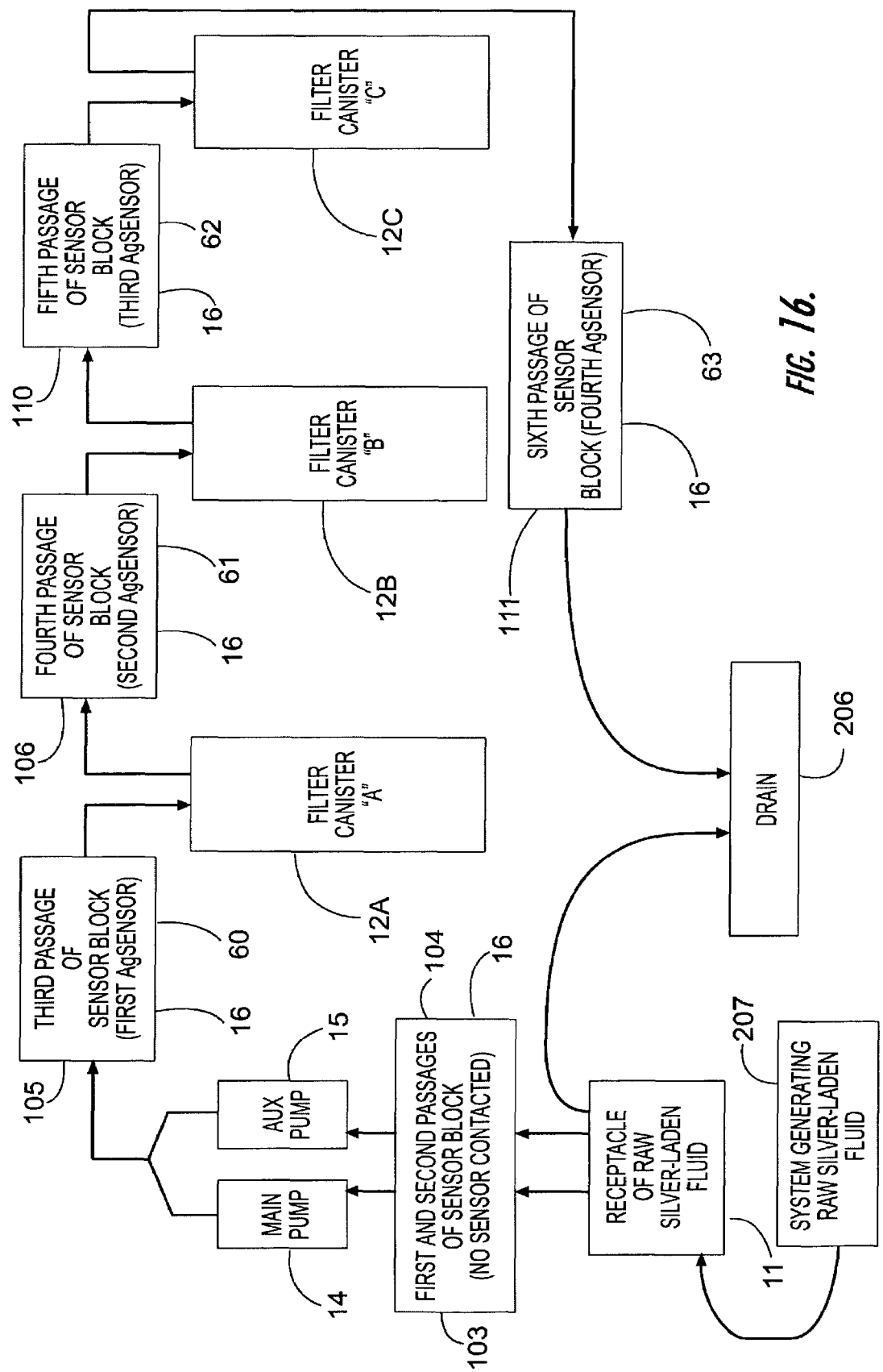
FIG. 16 is a flow chart generally illustrating the flow of fluid among various elements of the system.

Turning now to FIG. 16, a block diagram generally illustrating the flow of fluid in an embodiment of the invention is shown. Raw silver-laden fluid is expelled by an independent system 207 (e.g., a system for developing photographic film) for discarding. The fluid is deposited in the receptacle 11 to be processed by the silver recovery and monitoring system 10 (FIG. 1). Upon activation of the main pump 14 or the auxiliary pump 15 by the fluid level sensor 17 (FIG. 7) in the receptacle 11, the raw silver-laden fluid in the receptacle 11 is urged out of the receptacle 11. If the main pump 14 is operating, the fluid is pumped out of the receptacle 11 into the sensor block 16 through the inlet port 81 (FIGS. 3D, 10) on the left-hand surface 70 (FIG. 3D) of the sensor block 16, through the first passage 103 (FIG. 4) of the sensor block 16, and out the outlet port 66 (FIGS. 3C, 10) on the right-hand surface 64 (FIG. 3C) of the sensor block 16 into the main pump 14. Similarly, if the auxiliary pump 15 is operating, the fluid is pumped out of the receptacle 11 into the sensor block 16 through the inlet port 80 (FIGS. 3D, 10) on the left-hand surface 70 (FIG. 3D) of the sensor block 16, through the second passage 104 (FIG. 4) of the sensor block 16, and out the outlet port 66 (FIGS. 3C, 10) on the right-hand surface 64 (FIG. 3C) of the sensor block 16 into the auxiliary pump 15.

The fluid exiting the main pump 14 and the auxiliary pump 15 is combined in a "Y" or "T" shaped fitting 205 (FIG. 2) and flows back into the sensor block 16 through the inlet port 67 (FIG. 3C) on the right-hand surface 64 of the sensor block 16 and into the third passage 105 (FIG. 5) of the sensor block 16. While in the third passage 105, the fluid contacts the first silver sensor 60, from which, depending on the current status of the silver monitoring method being executed by the microprocessor 190 (FIGS. 15, 15Q-R), a reading of the silver concentration in the fluid may be taken. After flowing through the third passage 105 of the sensor block 16, the fluid flows out the outlet port 71 (FIGS. 3D, 10) on the left-hand surface 70 of the sensor block 16 and into the filter canister 12A. Within the system, the filter canister 12A is occasionally referred to only as "A" (e.g., the ports designated "To 'A'" and "From 'A'").

After passing through the filter canister 12A, the fluid flows back into the sensor block 16 through the inlet port 82 (FIGS. 3D, 10) on the left-hand surface 70 of the sensor block 16 and into the fourth passage 106 (FIG. 6) of the sensor block 16. While in the fourth passage 106, the fluid contacts the second silver sensor 61, from which, depending on the current status of the silver monitoring method being executed by the microprocessor 190, a reading of the silver concentration in the fluid may be taken. After flowing through the fourth passage 106 of the sensor block 16, the fluid flows out the outlet port 72 (FIGS. 3D, 10) on the left-hand surface 70 of the sensor block 16 and into the filter canister 12B. Within the system, the filter canister 12B is occasionally referred to only as "B" (e.g., the ports designated "To 'B'" and "From 'B'").

After passing through the filter canister 12B, the fluid flows back into the sensor block 16 through the inlet port 83 (FIGS. 3D, 10) on the left-hand surface 70 of the sensor block 16 and into the fifth passage 110 (FIG. 6) of the sensor block 16. While in the fifth passage 110, the fluid contacts the third silver sensor 62, from which, depending on the current status of the silver monitoring method being executed by the microprocessor 190, a reading of the silver concentration in the fluid may be taken. After flowing through the fifth passage 110 of the sensor block 16, the fluid flows out the outlet port 73 (FIGS. 3D, 10) on the left-hand surface 70 of the sensor block 16 and into the filter canister 12C. Within the system, the filter canister 12C is occasionally referred to only as "C" (e.g., the ports designated "To 'C'" and "From 'C'").

After passing through the filter canister 12C, the fluid flows back into the sensor block 16 through the inlet port 84 on the left-hand surface 70 of the sensor block 16 and into the sixth passage 111 (FIG. 6) of the sensor block 16. While in the sixth passage 111, the fluid contacts the fourth silver sensor 63, from which, depending on the current status of the silver monitoring method being executed by the microprocessor 190, a reading of the silver concentration in the fluid may be taken. After flowing through the sixth passage 111 of the sensor block 16, the fluid flows out the outlet port 74 (FIGS. 3D, 10) on the left-hand surface 70 of the sensor block 16 and through the drain hose 28 (FIG. 1) into a drain 206.

If the volume of raw silver-laden fluid being expelled by the independent system 207 into the silver recovery and monitoring system 10 (FIG. 1) exceeds the pumping capacity of the main pump 14 and the auxiliary pump 15 of the system 10, or if some other failure of the system 10 prevents the pumps 14, 15 from being able to keep pace with the volume of fluid being expelled by the independent system 207 into the receptacle 11, the raw silver-laden fluid flows out of the receptacle 11 through the drain pipe 26 (FIG. 1) and into the drain 206 without being filtered and without the silver in the fluid being recovered or monitored. This aspect of the system 10 prevents the fluid from overflowing out of the receptacle 11 into the worksite where the system 10 is located. When this condition occurs, referred to as a "drain violation" or a "violation" on the flow chart describing the "check drain" subroutine of the silver monitoring software (FIG. 17C), the overflow indicator activation rod 36 of the fluid level sensor 17 (FIG. 7) is contacted by the fluid and transmits a signal to the microprocessor 190, which transmits an error code (either error code 5 if the pumps are running or error code 6 if the pumps are not running; see FIG. 17C) to the modem 204 (FIGS. 15, 150) for transmission to the remote monitoring station 210. In addition, the overflow indicator latch circuit 182 (FIGS. 15, 15J) causes the "check system" LED 45 (overflow indicator) (FIG. 8) to illuminate on the front panel 113 of the unit box 13 of the system 10.

The fluid flow connections between the receptacle 11, the pumps 14, 15, the sensor block 16, and the filter canisters 12A, 12B, 12C, as well as the drain hose 28, are achieved with a flexible plastic tubing having restricted air permeability. Specifically, the tubing is comprised of a semi-rigid polyethylene interior extruded with a flexible polyvinyl exterior.

FIGS. 17-17H illustrate flow charts that generally depict a plurality of nested routines and subroutines programmed into the microprocessor 190 with software according to an embodiment of the invention. FIG. 17 is a master flow chart generally illustrating the overall silver monitoring method of an embodiment of the invention. However, FIG. 17 incorporates subroutines illustrated on other flow charts by reference. In the blocks designated "Execute Modem Call," "Check Raw," "Check Raw," "Check A," "Check B," "C Phase 1," and "C Phase 2," the flow chart in FIG. 17 incorporates subroutines generally illustrated by flow charts in FIG. 17A (modem call subroutine), FIG. 17G (raw check subroutine), FIG. 17B ("A" cartridge check subroutine), FIG. 17D ("B" cartridge check subroutine), FIG. 17E (C Phase 1 subroutine), and FIG. 17F (C Phase 2 subroutine), respectively. In turn, the "A" cartridge check subroutine (FIG. 17B), the "B" cartridge check subroutine (FIG. 17D), the C Phase 1 subroutine (FIG. 17E), and the C Phase 2 subroutine (FIG. 17F) incorporate the modem call subroutine (FIG. 17A) by using the "Execute Modem Call" designation and a check drain subroutine (FIG. 17C) by using the "Execute Drain Check" or "Check Drain" designations. Finally, the check drain subroutine (FIG. 17C) incorporates the leak detect subroutine generally illustrated by the flow chart in FIG. 17H by using the "Execute Check Leaks" designation.

In these flow charts (FIGS. 17–17H), the terms "Raw Sensor," "'A' Sensor," "'B' Sensor," and "'C' Sensor" refer to the first, second, third, and fourth silver sensors 60-63, respectively. The terms "RawAB Thrsh" and "CLEAK-TRSH" refer to fixed voltage values that are incorporated into the software to help ensure that the system does not allow the amount of silver being passed through the system to surpass an acceptable level without providing adequate notification signals to the remote monitoring station 210 via the modem 204. The terms "RawAvg" and "AAvg" denote the results of averaging multiple readings from the "Raw Sensor" and the "'A' Sensor," respectively, to help ensure that anomalous spikes or dips in the voltages transmitted by these sensors do not affect proper operation of the system. The incorporation of a "strikes"-based notification system further protects the system from overreacting to ephemeral anomalies in sensor readings. The references to "the First Call" and the "Time to Call" indicate that the modem 204 is instructed to re-send certain error codes to the remote monitoring station 210 at certain predetermined time intervals until the problem causing the error code to be sent is rectified. This prevents the system from unnecessarily contacting the remote monitoring station 210 every time the same occurrence of a certain problem is detected by the system. Finally, the microprocessor 190 may be enabled to transmit (via the modem 204) at least one daily error code (error code 8; "Regular Calls") to the remote monitoring station 210 to inform the remote monitoring station 210 that the system is operating, and will transmit error codes to the remote monitoring station 210 whenever the system is reset (error code 0; "New Power Up"), and a predetermined time interval after a reset (error code 8; "3 Day Calls").

In addition to sending error codes to the remote monitoring station 210 via the modem 204, the microprocessor 190 causes the "monitoring" LEDs 114, 115, 116 (FIGS. 8, 15) to illuminate when signals are being received by the microprocessor 190 from the second, third, and fourth silver sensors 61, 62, 63, respectively. The microprocessor 190 causes the "max capacity" LEDs 120, 121 (FIGS. 8, 15) and the "check drain" LED 122 (FIGS. 8, 15) to illuminate when the microprocessor 190 has determined that the filter canisters 12A, 12B, 12C, respectively, are no longer reducing the silver concentration in the fluid passing through them.

The source code of an embodiment of the software used to program the microprocessor 190 is provided with this application as a computer program listing appendix stored on a recordable compact disc (CD-R) filed with the application. The code is written in the TF BASIC programming language, a proprietary language used to program the Tattletale TFX- 11 microprocessor used in the illustrated embodiment of the invention. The operation manual for the Tattletale TFX-11 microprocessor, including a description of the TF BASIC language used to program the Tattletale TFX-11, may be accessed as an Adobe Personal Document Format (PDF) file on the Internet at ftp://ftp.onsetcomp.com/Public/TattleTale/Manuals/TFX11MAN.pdf. The Tattletale TFX-11 microprocessor, the TF BASIC programming language, and the operation manual for the Tattletale TFX-11 are proprietary to Onset Computer Corporation, P.O. Box 3450, Pocasset, MA 02559-3450, which operates a site on the World Wide Web at http://www.onsetcomp.com.

Via the microprocessor 190 and the modem 204, the remote monitoring station 210 (FIG. 15) receives routine updates of the signal transmitted by the fourth silver sensor 63, the furthest downstream silver sensor in the system, and converts these periodic signals into a report of the parts per million of silver being passed through the drain 206 (FIG. 16) into the environment. This report may then be accessed by the user of the system via the World Wide Web in order that the user may monitor its own compliance with the government regulation that imposes a 5 parts per million maximum on the amount of silver that may be discharged into the environment. However, as long as the system is functioning properly, it is intended for the operator of the remote monitoring station 210, pursuant to service agreements with the user of the system, to perform any maintenance of the user's system that is necessary to ensure the user's compliance with the government regulation. Such maintenance would likely include servicing the filter canisters within a reasonable time after receiving a notification signal from the modem in the user's system that one or more of the filter canisters are spent (i.e., that the silver concentration in the fluid entering a filter canister is greater than or equal to the silver concentration in the fluid exiting the same canister). Therefore, in the absence of unforeseeable malfunctions in the system, the system and the operator of the remote monitoring station 210 should be able to keep the user of the system in consistent compliance with the government regulation without the need for intervention by the user, beyond the need for the user to allow maintenance personnel to gain access to the system for maintenance purposes.

The embodiment of the invention disclosed herein is currently marketed by Chemtronix Inc. 144 Industrial Park Drive, Waynesville, NC 28786, as Model CTX- 2000 (standard receptacle size) or Model CTX-3000 (larger receptacle size). Another embodiment of the invention is as described herein but with only two silver sensors and one pump, with appropriate alterations to the sensor block, the tubing, the receptacle, the software, and other elements of the system to accommodate the reduced capabilities of this embodiment, which is currently marketed by Chemtronix Inc. as Model CTX-1000. Further embodiments of the invention, either with capabilities lesser or greater that those described herein, may be practiced without departing from the scope of the invention. For instance, as shown on FIGS. 15J and 15M in conjunction with the model number CTX-500, the system may use only the LEDs on the front panel 113 of the unit box 13 to provide the notification signals contemplated herein, without incorporating a microprocessor or a modem and with only one silver sensor and one pump. Of course, such a system would require the user of the system to function as the silver monitoring station, as no automated computerized connections to the remote monitoring station 210 would be present.

A silver recovery and monitoring system is described above. Various details of the invention may be changed without departing from its scope. Furthermore, the foregoing description of an embodiment of the invention and the best mode for practicing the invention are provided for the purpose of illustration only and not for the purpose of limitation—the invention being defined by the claims.

What is claimed is:

1. A silver recovery and monitoring system, comprising:
   a sensor for transmitting a silver concentration signal in response to the concentration of silver in a fluid;
   means for determining whether the silver concentration signal indicates the concentration of silver in the fluid to be above a predetermined silver level and for initiating a silver alert signal in response to a determination that the silver concentration signal indicates the concentration of silver in the fluid to be above the predetermined silver level; and means for transmitting a notification signal to a silver monitoring station in response to the silver alert signal.

2. A silver recovery and monitoring system according to claim 1, wherein the system further comprises at least one filter upstream from the sensor for removing silver from the fluid.

3. A silver recovery and monitoring system, comprising:
a sensor for transmitting a silver concentration signal in response to the concentration of silver in a fluid;
a microprocessor programmed to determine whether the silver concentration signal indicates the concentration of silver in the fluid to be above a predetermined silver level and to initiate a silver alert signal in response to a determination that the silver concentration signal indicates the concentration of silver in the fluid to be above the predetermined silver level; and
a modem or light-emitting diode for transmitting a notification signal to a silver monitoring station in response to the silver alert signal.

4. A silver recovery and monitoring system according to claim 3, wherein the system further comprises at least one filter upstream from the sensor for removing silver from the fluid.

5. A silver recovery and monitoring system, comprising:
a plurality of filters for removing silver from a fluid;
a sensor downstream from the furthest downstream filter of the plurality of filters, said sensor being configured to transmit a silver concentration signal in response to the concentration of silver in the fluid;
means for determining whether the silver concentration signal indicates the concentration of silver in the fluid to be above a predetermined silver level and for initiating a silver alert signal in response to a determination that the silver concentration signal indicates the concentration of silver in the fluid to be above the predetermined silver level; and
means for transmitting a notification signal to a silver monitoring station in response to the silver alert signal.

6. A silver recovery and monitoring system, comprising:
a plurality of filters for removing silver from a fluid;
a sensor downstream from the further downstream filter of the plurality of filters, said sensor being configured to transmit a silver concentration signal in response to the concentration of silver in the fluid;
a microprocessor programmed to determine whether the silver concentration signal indicates the concentration of silver in the fluid to be above a predetermined silver level and to initiate a silver alert signal in response to a determination that the silver concentration signal indicates the concentration of silver in the fluid to be above the predetermined silver level; and
a modem or light-emitting diode for transmitting a notification signal to a silver monitoring station in response to the silver alert signal.

7. A silver recovery and monitoring system, comprising:
a plurality of filters for removing silver from a fluid;
a plurality of sensors distributed within the system such that at least one sensor is located between each pair of adjacent filters in the plurality of filters and at least one sensor is located downstream from the furthest downstream filter of the plurality of filters, each of said plurality of sensors being configured to transmit a silver concentration signal in response to the concentration of silver in the fluid;

means for determining whether the silver concentration signal transmitted by each of the plurality of sensors indicates the concentration of silver in the fluid to be above a predetermined silver level and for initiating a silver alert signal in response to a determination that the silver concentration signal indicates the concentration of silver in the fluid to be above the predetermined silver level; and means for transmitting a notification signal to a silver monitoring station in response to the silver alert signal.

8. A silver recovery and monitoring system, comprising:
a plurality of filters for removing silver from a fluid;
a plurality of sensors distributed within the system such that at least one sensor is located between each pair of adjacent filters in the plurality of filters and at least one sensor is located downstream from the furthest downstream filter of the plurality of filters, each of said plurality of sensors being configured to transmit a silver concentration signal in response to the concentration of silver in the fluid;
a microprocessor programmed to determine whether the silver concentration signal transmitted by each of the plurality of sensors indicates the concentration of silver in the fluid to be above a predetermined silver level and to initiate a silver alert signal in response to a determination that the silver concentration signal indicates the concentration of silver in the fluid to be above the predetermined silver level; and
a modem or light-emitting diode for transmitting a notification signal to a silver monitoring station in response to the silver alert signal.

9. A method for recovering and monitoring silver, said method comprising the steps of:
transmitting a silver concentration signal in response to the concentration of silver in a fluid;
determining whether the silver concentration signal indicates the concentration of silver in the fluid to be above a predetermined silver level;
transmitting a silver alert signal in response to a determination that the silver concentration signal indicates the concentration of silver in the fluid to be above the predetermined silver level; and
transmitting a notification signal to a silver monitoring station in response to the silver alert signal.

10. A method for recovering a monitoring silver according to claim 9 wherein:
before said transmitting of the silver concentration signal, said method further comprises the step of filtering silver from the fluid.

11. A method for recovering a monitoring silver, said method comprising the steps of:
filtering silver from a fluid;
transmitting a silver concentration signal in response to the concentration of silver in the fluid;
determining whether the silver concentration signal indicates the concentration of silver in the fluid to be above a predetermined silver level;
transmitting a silver alert signal in response to a determination that the silver concentration signal indicates the concentration of silver in the fluid to be above the predetermined silver level; and
transmitting a notification signal to a silver monitoring station in response to the silver alert signal.

* * * * *